(12) United States Patent
Naghshvar et al.

(10) Patent No.: US 10,110,337 B2
(45) Date of Patent: Oct. 23, 2018

(54) TECHNIQUES FOR PERFORMING CARRIER SENSE ADAPTIVE TRANSMISSION IN UNLICENSED SPECTRUM

(71) Applicant: QUALCOMM Incorporated, San Diego, CA (US)

(72) Inventors: Mohammad Naghshvar, San Diego, CA (US); Ahmed Kamel Sadek, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 15/221,294

(22) Filed: Jul. 27, 2016

(65) Prior Publication Data

US 2017/0063484 A1 Mar. 2, 2017

Related U.S. Application Data

(60) Provisional application No. 62/211,627, filed on Aug. 28, 2015.

(51) Int. Cl.
*H04J 11/00* (2006.01)
*H04L 29/06* (2006.01)
(Continued)

(52) U.S. Cl.
CPC ........ *H04J 11/0023* (2013.01); *H04B 17/318* (2015.01); *H04B 17/336* (2015.01);
(Continued)

(58) Field of Classification Search
None
See application file for complete search history.

(56) References Cited

U.S. PATENT DOCUMENTS

| 2009/0285169 A1* | 11/2009 | Yang | H04W 52/143 370/329 |
| 2013/0003591 A1* | 1/2013 | Novak | H04W 72/085 370/252 |

(Continued)

OTHER PUBLICATIONS

International Search Report and Written Opinion—PCT/US2016/044392—ISA/EPO—dated Oct. 12, 2016. (14 total pages).

(Continued)

*Primary Examiner* — Christopher Crutchfield
*Assistant Examiner* — Alan Lindenbaum
(74) *Attorney, Agent, or Firm* — Arent Fox, LLP and Qualcomm

(57) ABSTRACT

Aspects for reducing interference between networks are provided. A signal transmitted by one or more devices in a first network over a communications medium using an unlicensed frequency spectrum is decoded to determine one or more parameters of a packet in the signal. A level of utilization of the communications medium by the one or more devices in the first network can be estimated based at least in part on a signal strength of the signal and the one or more parameters. A period of time for communicating in a second network over the communications medium using the unlicensed frequency spectrum can be adjusted based at least in part on the level of utilization of the communications medium by the first network. In addition, a number of active transmitters over the communications medium can be determined based at least in part on identifying a source entity related to transmission of the signal, and adjusting the time for communicating in the second network can be further based at least in part on the number of active transmitters.

30 Claims, 14 Drawing Sheets

(51) Int. Cl.
*H04L 12/801* (2013.01)
*H04L 5/00* (2006.01)
*H04B 17/318* (2015.01)
*H04B 17/336* (2015.01)
*H04W 74/08* (2009.01)
*H04W 40/24* (2009.01)
*H04W 16/32* (2009.01)
*H04W 84/12* (2009.01)
*H04W 28/14* (2009.01)
*H04W 16/14* (2009.01)

(52) U.S. Cl.
CPC ............ *H04L 5/0055* (2013.01); *H04L 47/29* (2013.01); *H04L 69/22* (2013.01); *H04W 40/244* (2013.01); *H04W 74/0808* (2013.01); *H04W 74/0816* (2013.01); *H04W 16/14* (2013.01); *H04W 16/32* (2013.01); *H04W 28/14* (2013.01); *H04W 84/12* (2013.01)

(56) References Cited

U.S. PATENT DOCUMENTS

| | | | | |
|---|---|---|---|---|
| 2013/0208587 | A1* | 8/2013 | Bala | H04W 16/14 370/230 |
| 2014/0126403 | A1* | 5/2014 | Siomina | H04W 24/10 370/252 |
| 2015/0085683 | A1 | 3/2015 | Sadek et al. | |
| 2015/0280863 | A1* | 10/2015 | Muqaibel | H04L 1/0048 375/350 |
| 2016/0088631 | A1* | 3/2016 | Hedayat | H04W 16/14 370/329 |

OTHER PUBLICATIONS

Kudo R., et al., "An Advanced Wi-Fi Data Service Platform Coupled with a Cellular Network for Future Wireless Access", IEEE Communications Magazine, vol. 52, No. 11, Nov. 1, 2014 (Nov. 1, 2014), pp. 46-53, ISSN: 0163-6804, DOI: 10.1109/MCOM.2014. 6957142 [retrieved on Nov. 13, 2014].

* cited by examiner

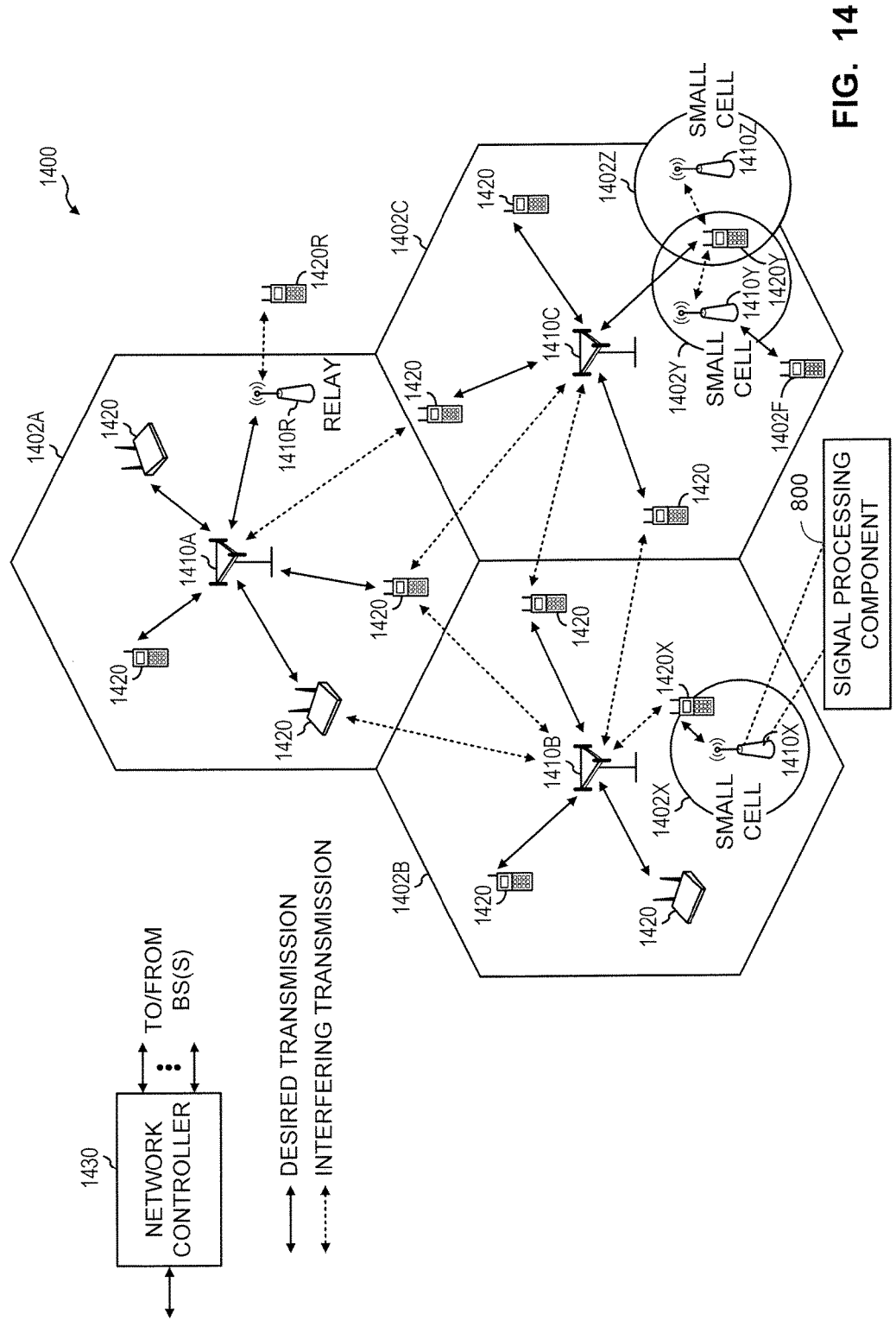

TECHNIQUES FOR PERFORMING CARRIER SENSE ADAPTIVE TRANSMISSION IN UNLICENSED SPECTRUM

CLAIM OF PRIORITY UNDER 35 U.S.C. § 119

The present Application for Patent claims priority to Provisional Application No. 62/211,627 entitled "TECHNIQUES FOR PERFORMING CARRIER SENSE ADAPTIVE TRANSMISSION IN UNLICENSED SPECTRUM" filed Aug. 28, 2015, which is assigned to the assignee hereof and hereby expressly incorporated by reference herein for all purposes.

INTRODUCTION

Aspects of this disclosure relate generally to telecommunications, and more particularly to interference mitigation and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations are deployed to supplement conventional macro networks. Small cell base stations may also provide incremental capacity growth, richer user experience, and so on.

Small cell LTE operations, for example, have been extended into unlicensed frequency spectrum such as the Unlicensed National Information Infrastructure (U-NII) band used by Wireless Local Area Network (WLAN) technologies. Unlicensed frequency spectrum, may sometimes be referred to as shared (frequency) spectrum or shared (frequency) access spectrum. Moreover, the terms frequency spectrum, frequency band, spectrum, or band may be used interchangeably in this disclosure. This extension of small cell LTE operation into unlicensed frequency spectrum is designed to increase spectral efficiency and hence capacity of the LTE system. However, it may also encroach on the operations of other Radio Access Technologies (RATs) that typically utilize the same unlicensed bands, such as IEEE 802.11x WLAN technologies generally referred to as "Wi-Fi."

Over-the-air (OTA) interference detection is employed in some networks in an attempt to mitigate interference caused by such encroachment. For example, a device may periodically monitor (e.g., sniff) for energy in the radio frequency (RF) band used by the device. Upon detection of any kind of energy, which may be indicative of other devices using the RF band, the device may back-off the RF band (e.g., refrain from using the RF band, lowering power used in the RF band, etc.) for a period of time.

In practice, however, there may be challenges with such a back-off or "listen-before-talk" (LBT) approach, at least in its conventional implementation. For example, for an LTE system operating in an unlicensed band with a Wi-Fi co-channel scenario where it is desired to avoid interference from Wi-Fi, the detected energy in the band might not be from a Wi-Fi device, or might not be substantial such to warrant backing-off. In addition, the detected energy in the band may simply be adjacent channel leakage, which may not be affected by another device using the band. Consequently, an LTE device may back off transmissions in the band even when there is no substantial Wi-Fi interference. In other instances, for example, coexistence between LTE and Wi-Fi in the unlicensed RF band can result in LTE performance degradation to protect Wi-Fi communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects, a method for reducing interference between networks is provided. The method includes decoding a signal transmitted by one or more devices in a first network over a communications medium using an unlicensed frequency spectrum to determine one or more parameters of a packet in the signal, estimating a level of utilization of the communications medium by the one or more devices in the first network based at least in part on a signal strength of the signal and the one or more parameters, and adjusting a period of time for communicating in a second network over the communications medium using the unlicensed frequency spectrum based at least in part on the level of utilization of the communications medium.

In accordance with additional aspects, an apparatus for reducing interference between networks is provided. The apparatus includes a transceiver, a memory configured to store a buffer including one or more messages for transmitting via the transceiver, and at least one processor communicatively coupled with the transceiver and the memory. The at least one processor is configured to decode a signal transmitted by one or more devices in a first network over a communications medium using an unlicensed frequency spectrum to determine one or more parameters of a packet in the signal, estimate a level of utilization of the communications medium by the one or more devices in the first network based at least in part on a signal strength of the signal and the one or more parameters, and adjust a period of time for communicating in a second network over the communications medium using the unlicensed frequency spectrum based at least in part on the level of utilization of the communications medium In accordance with further aspects, another apparatus for reducing interference between networks is provided. The apparatus includes means for decoding a signal transmitted by one or more devices in a first network over a communications medium using an unlicensed frequency spectrum to determine one or more parameters of a packet in the signal, means for estimating a level of utilization of the communications medium by the one or more devices in the first network based at least in part on a signal strength of the signal and the one or more parameters, and means for adjusting a period of time for communicating in a second network over the communications medium using the unlicensed frequency spectrum based at least in part on the level of utilization of the communications medium.

Still in accordance with additional aspects, a computer-readable medium storing computer executable code for reducing interference between networks. The code includes code for decoding a signal transmitted by one or more devices in a first network over a communications medium using an unlicensed frequency spectrum to determine one or more parameters of a packet in the signal, code for estimating a level of utilization of the communications medium by the one or more devices in the first network based at least in part on a signal strength of the signal and the one or more parameters, and code for adjusting a period of time for communicating in a second network over the communications medium using the unlicensed frequency spectrum based at least in part on the level of utilization of the communications medium.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof.

FIG. 14 illustrates an example communication system environment in which the teachings and structures herein may be may be incorporated.

DETAILED DESCRIPTION

Figure 1:
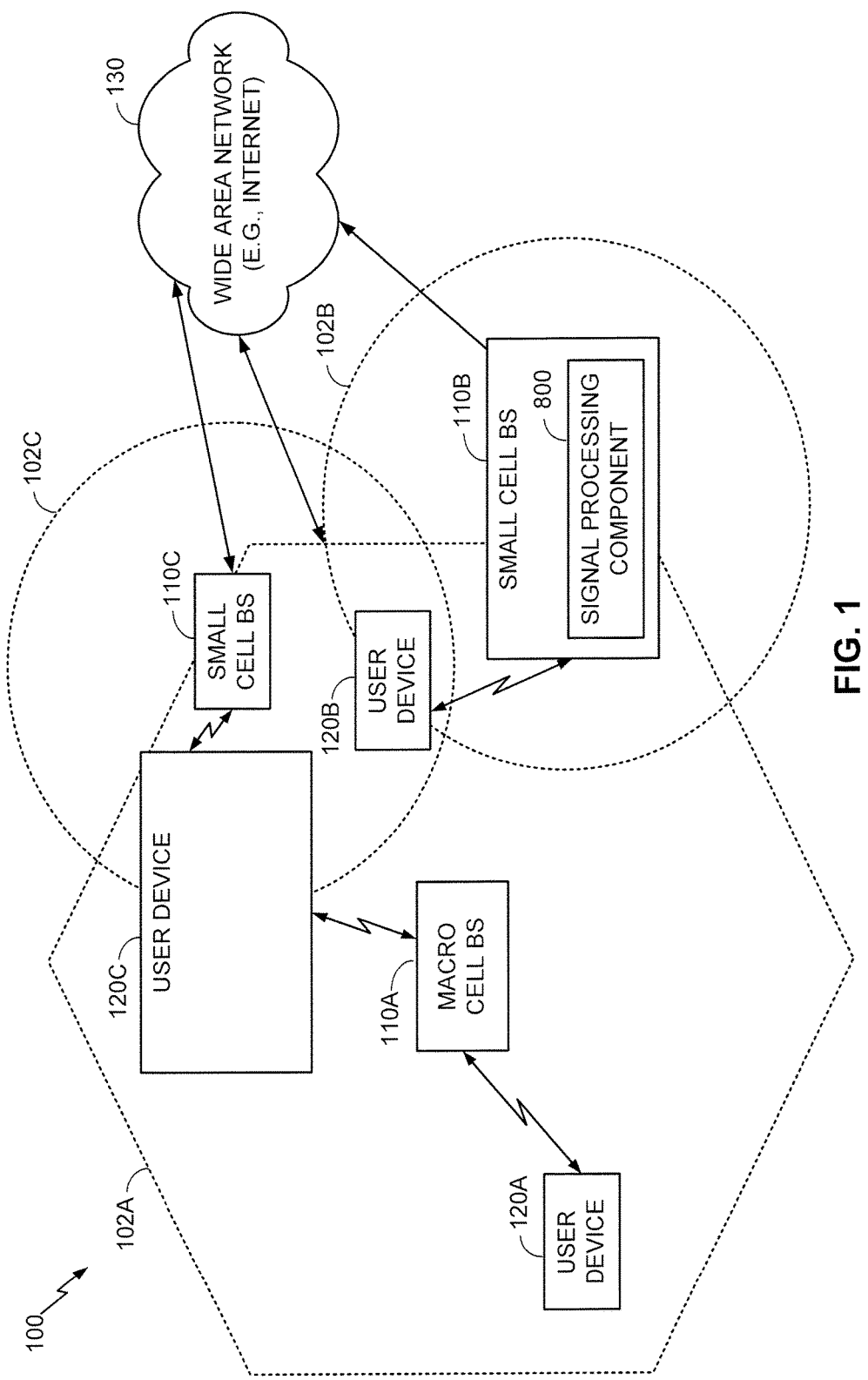
FIG. 1 illustrates an example mixed-deployment wireless communication system including macro cell base stations and small cell base stations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to performing carrier sense adaptive transmission at a network in an unlicensed spectrum by adjusting a period of time for utilizing certain resources for transmission based on estimating a medium utilization (MU) (e.g., a level of utilization of a communications medium) of at least a portion of the resources by one or more other networks. For example, the period of time for utilizing the resources for transmission (and/or a range of time over which the time for utilizing the resources for transmission is adjusted) may be adjusted based on determining a number of active transmitters over the medium. In particular, transmission over the resources by the network may cause interference to communication links of one or more other networks operating over a similar radio frequency (RF) band, and thus MU of the other networks over the resources can be estimated to determine a period of time to back-off or refrain from using the resources for transmission to mitigate interference to the one or more other networks. In an example, the MU can be estimated based at least in part on sniffing (e.g., receiving and inspecting) signals transmitted in the one or more other networks to determine a received signal strength of the signals and one or more parameters (e.g., packet or signal metrics, statistics, etc.) of the signals. The one or more parameters can relate to parameters that can be decoded or obtained from the signal, such as a duration of the signal, a modulation and coding scheme (MCS) of the signal, a type of a packet within the signal, an identification of a source entity transmitting the signal, and/or the like.

In some cases, estimating MU based only on a received signal strength may cause back-off in cases where there is no interference (e.g., where a device or access point (AP) of the one or more other networks is not within the coverage area of the network). In an example, in estimating the MU, consideration and/or additional weighting can be given to signals from the one or more other networks having a certain strength and/or determined parameters that indicate the signals relate to a potentially interfered link in the one or more other networks. This can ensure that the estimated MU applies to signals that may be potentially interfered by transmissions from the device detecting the MU. Accordingly, the period of time for back-off of the device can be increased or otherwise adjusted based on the estimated MU to mitigate interference over the potentially interfered link and not necessarily where there is no potentially interfered link detected or where the detected link is not hindered by the interference.

As used herein, the term "communications medium" can include substantially any wired or wireless medium over which one or more network nodes can communicate using a radio transceiver (e.g., transmitter and/or receiver) to send, receive, and process signals from one another. For example, a "communications medium" can include a RF band, RF resources over one or more time periods, etc. Moreover, an "unlicensed" frequency band or spectrum, as used herein, can refer to a portion of RF space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based RF band or spectrum.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example mixed-deployment wireless communication system 100, in which small cell base stations are deployed in conjunction with and to supplement the coverage of macro cell base stations. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femto cell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the medium utilization estimation and corresponding interference mitigation discussed briefly above. For example, one or more of the small cell base stations 110 may include a signal processing component 800, as described further in FIGS. 8-11. Substantially any device, however, can include a signal processing component 800, as described herein, to estimate a medium utilization by surrounding devices and/or utilize the estimated medium utilization in performing interference mitigation for communicating in a wireless network. Surrounding devices (or their related cells) may refer to devices (or cells) that are sufficiently nearby that their operations can impact the same medium and can cause interference in the same medium.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 in the example of the wireless communication system 100 include an example of a macro cell base station 110A and two examples of small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

For illustration purposes, an example downlink and uplink frame structure for an LTE signaling scheme is described below with reference to FIGS. 2-3. Various aspects of FIGS. 2-3 may apply to the use of carrier sense adaptive transmission in unlicensed spectrum as described herein.

Figure 2:
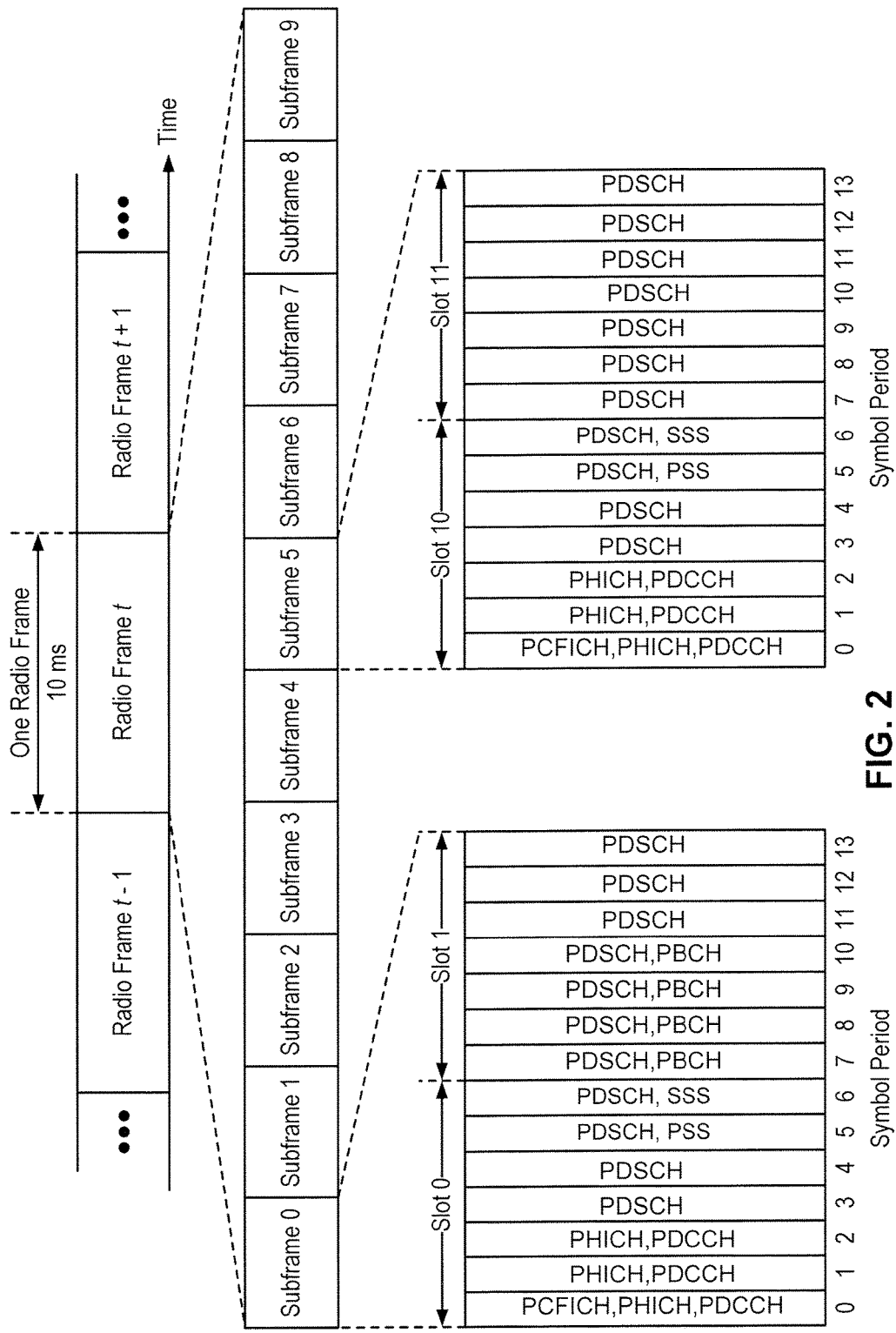
FIG. 2 is a block diagram illustrating an example downlink frame structure for LTE communications.

FIG. 2 is a block diagram illustrating an example downlink frame structure for LTE communications. In LTE, the base stations 110 of FIG. 1 are generally referred to as eNBs and the user devices 120 are generally referred to as UEs. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
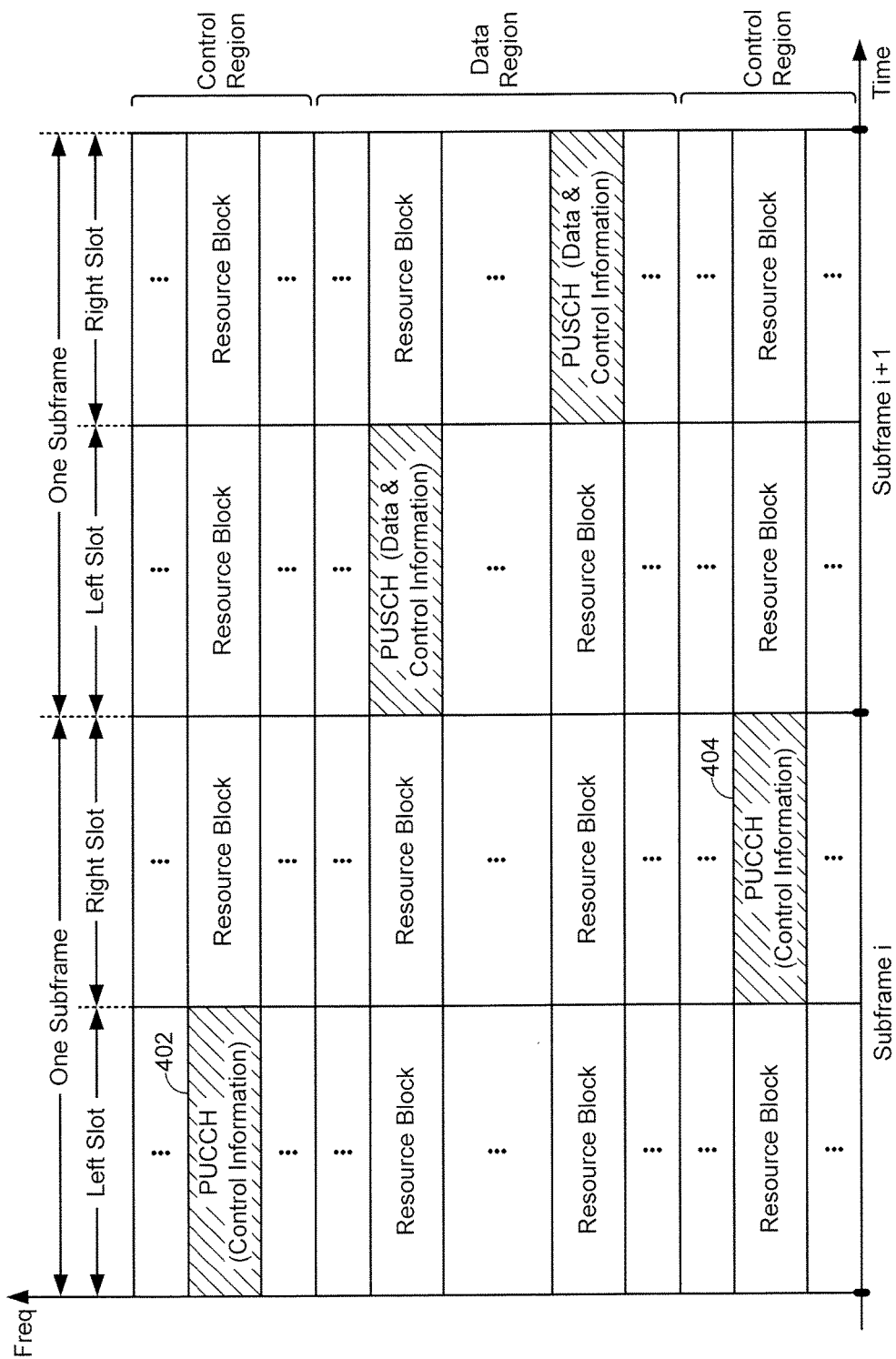
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed or shared frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band can be otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways or configurations. For example, in some systems, the unlicensed spectrum may be employed in a standalone configuration, with all carriers operating exclusively in an unlicensed portion of the wireless spectrum (e.g., LTE Standalone). In such configuration, both control information and data are communicated over an unlicensed portion of the wireless spectrum. In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In one example, the anchor licensed carrier may be used to communicate control information and the one or more unlicensed carries may be used to communicate data. In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio co-located with its cellular radio. According to various aspects described herein, the small cell base station may leverage the co-located radio to facilitate co-existence between the different RATs when operating on a shared unlicensed band. For example, the co-located radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4:
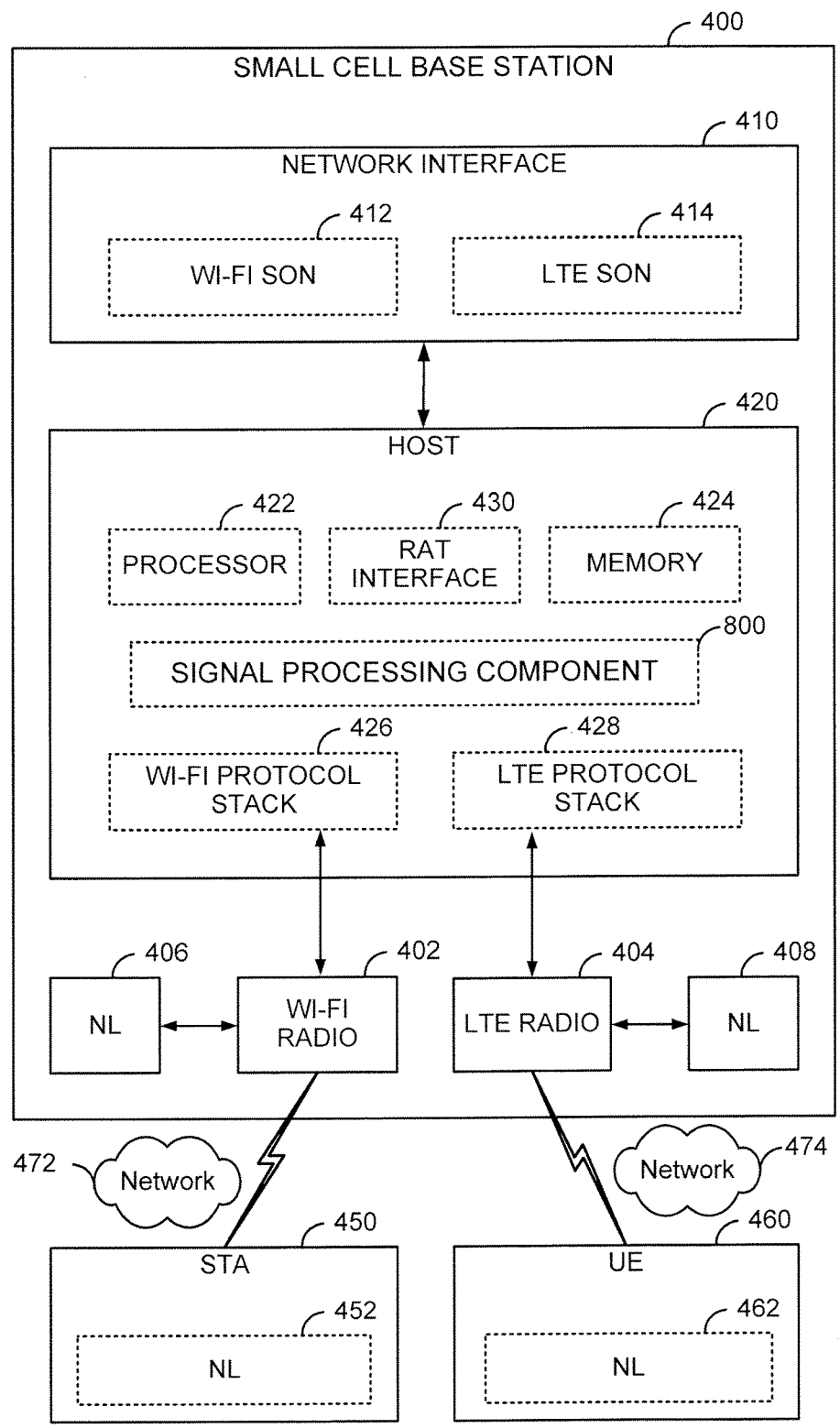
FIG. 4 illustrates an example small cell base station with co-located radio components (e.g., LTE and Wi-Fi) configured for unlicensed spectrum operation.

FIG. 4 illustrates an example of a small cell base station with co-located radio components configured for unlicensed spectrum operation. The small cell base station 400 may correspond, for example, to one of the small cell base stations 110B, 110C illustrated in FIG. 1. Small cell base station 400 may include a signal processing component 800, as described further herein in FIGS. 8-11, to facilitate adjusting periods of time for communication over a communication medium based at least in part on estimating a level of utilization of a communication medium by other wireless technologies, as described herein. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including a Wi-Fi radio 402 (e.g., an 802.11x radio component/module (e.g., transceiver)) co-located within the small cell base station 400 with an LTE radio 404 (e.g., an LTE component/module (e.g., transceiver)).

As used herein, the term co-located (e.g., radios, base stations, transceivers, etc.) may include in accordance with various aspects, one or more of, for example: components that are in the same housing (e.g., a housing of small cell base station 400); components that are hosted by the same processor (e.g., a processor 422 of the small cell base station 400); components that are within a defined distance of one another; and/or components that are connected via an interface (e.g., an Ethernet switch) where the interface may meet latency requirements of an inter-component communication (e.g., messaging). In some designs, the advantages discussed herein may be achieved by adding a radio component of a RAT native to the unlicensed band to be used by a given cellular small cell base station for wireless communications without that base station necessarily providing corresponding communication access via the native unlicensed band RAT. In a specific example, in this regard, a Wi-Fi radio, chip, or similar circuitry can be added to, and utilized by, an LTE small cell base station to receive Wi-Fi signals in the unlicensed band, as described further herein. If desired, a low functionality Wi-Fi circuit may be employed to reduce costs (e.g., a Wi-Fi receiver providing low-level sniffing of communications in the unlicensed band).

Returning to FIG. 4, the Wi-Fi radio 402 and the LTE radio 404 may perform monitoring of one or more channels (e.g., on a corresponding carrier frequency) to perform various corresponding operating channel or environment measurements (e.g., channel quality indicator (CQI), RSSI, RSRP, or other RLM measurements) using corresponding Network/Neighbor Listen (NL) modules 406 and 408, respectively, or any other suitable component(s).

The small cell base station 400 may communicate with one or more user devices via the Wi-Fi radio 402 and the LTE radio 404, illustrated as an STA 450 and a UE 460, respectively. For example, small cell base station 400 can transmit and/or receive signals over a network 472 (e.g., a Wi-Fi radio access network (RAN) over which devices communicate using a Wi-Fi RAT) and/or can transmit and/or receive signals over a network 474 (e.g., an LTE RAN over which devices communicate using an LTE RAT). Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively over network 472 or 474. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges. Host 420 may include the signal processing component 800 for estimating utilization of a communication medium and/or performing interference cancellation based thereon, as described, though in some examples, signal processing component 800 may be included in or otherwise implemented by one or more of the radios 402, 404, NL modules 406, 408, etc. In this example, signal processing component 800 may communicate with the host 420 via one or more interfaces between the host 420 and radios 402, 404, NL modules 406, 408, etc.

Figure 5:
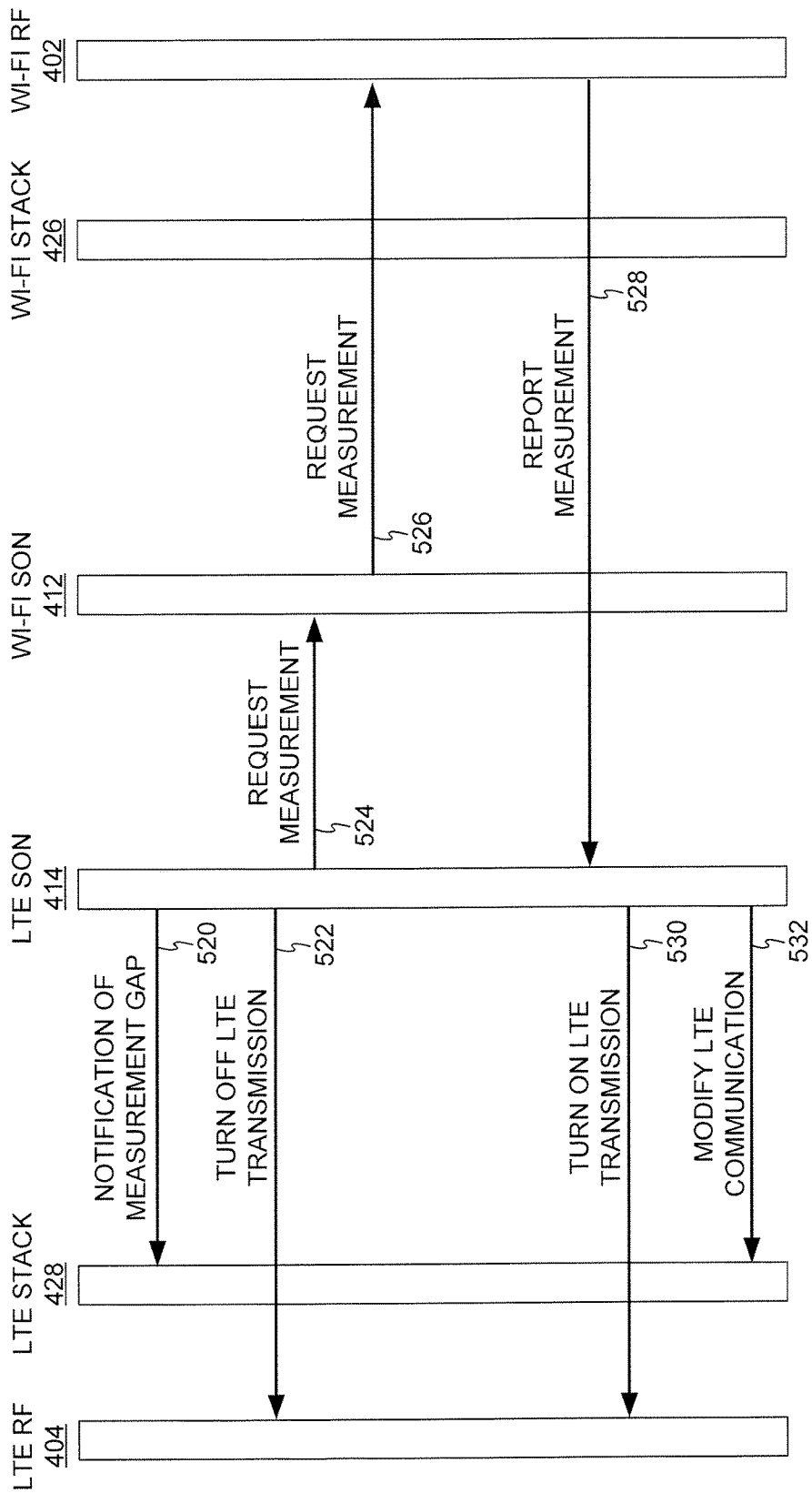
FIG. 5 is a signaling flow diagram illustrating an example message exchange between co-located radios.

FIG. 5 is a signaling flow diagram illustrating an example of a message exchange between co-located radios (e.g., radios positioned at a same small cell base station). In this example, one RAT (e.g., LTE) requests a measurement from another RAT (e.g., Wi-Fi) and opportunistically ceases transmission for the measurement. FIG. 5 will be explained below with continued reference to FIG. 4.

Initially, the LTE SON 414 notifies the LTE protocol stack 428 via a message 520 that a measurement gap is upcoming on the shared unlicensed band. The LTE SON 414 then sends a command 522 to cause the LTE radio (RF) 404 to temporarily turn off transmission on the unlicensed band, in response to which the LTE radio 404 disables or otherwise decreases power to one or more RF components (e.g., one or more components of an RF front end, such as one or more power amplifiers, low noise amplifiers, processors, etc.) for a period of time (e.g., so as to not interfere with any measurements during this time).

The LTE SON 414 also sends a message 524 to the co-located Wi-Fi SON 412 requesting that a measurement be taken on the unlicensed band. In response, the Wi-Fi SON 412 sends a corresponding request 526 via the Wi-Fi protocol stack 426 to the Wi-Fi radio 402, or some other suitable Wi-Fi radio component (e.g., a low cost, reduced functionality Wi-Fi receiver).

After the Wi-Fi radio 402 conducts measurements for Wi-Fi related signaling on the unlicensed band, a report 528 including the results of the measurements is sent to the LTE SON 414 via the Wi-Fi protocol stack 426 and the Wi-Fi SON 412. In some instances, the measurement report may include not only measurements performed by the Wi-Fi radio 402 itself, but also measurements collected by the Wi-Fi radio 402 from the STA 450 (e.g., measurements performed by STA 450 of other devices). Further, for example, Wi-Fi radio 402, or another portion of a corresponding small cell base station, may include a signal processing component, as described herein in FIGS. 4 and 8-11, to estimate a level of utilization of the communications medium by Wi-Fi signals based on additional parameters of received signals. The LTE SON 414 may then send a command 530 to cause the LTE radio 404 to turn back on transmission on the unlicensed band (e.g., at the end of the defined period of time). For example, LTE SON 414 may send the command 530 to cause the LTE radio 404 to enable or otherwise increase power to the one or more RF components.

The information included in the measurement report (e.g., information indicative of how Wi-Fi devices are utilizing the unlicensed band) may be compiled along with various LTE measurements and measurement reports. Based on information about the current operating conditions on the shared unlicensed band (e.g., as collected by one or a combination of the Wi-Fi radio 402, the LTE radio 404, the STA 450, and/or the UE 460), the small cell base station 400, e.g., via signal processing component 800, may specially adapt different aspects of its cellular operations in order to manage co-existence between the different RATs. Returning to FIG. 5, the LTE SON 414, for example, may then send a message 532 that informs the LTE protocol stack 428 how LTE communication is to be modified.

There are several aspects of cellular operation that may be adapted in order to manage co-existence between the different RATs. For example, the small cell base station 400 may select certain carriers as preferable when operating in the unlicensed band, may opportunistically enable or disable operation on those carriers, may selectively adjust the transmission power of those carriers, if necessary (e.g., periodically or intermittently in accordance with a transmission pattern), and/or take other steps to balance the desire for efficient cellular operation against the need for stable co-existence.

Figure 6:
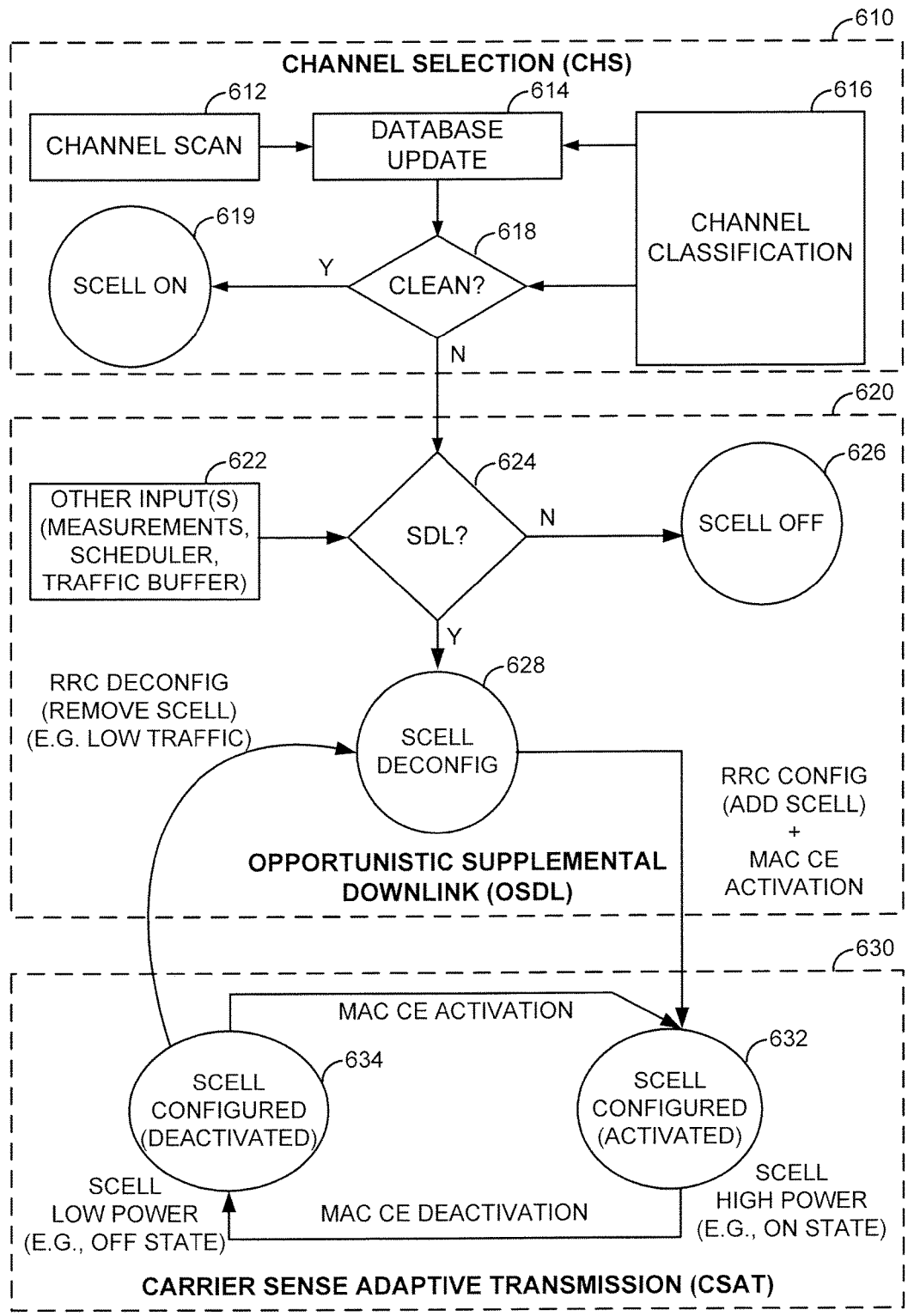
FIG. 6 is a system-level co-existence state diagram illustrating different aspects of cellular operation that may be specially adapted to manage co-existence between different RATs operating on a shared unlicensed band.

FIG. 6 is a system-level co-existence state diagram illustrating different example aspects of cellular operation that may be specially adapted to manage co-existence between different RATs operating on a shared unlicensed band. Co-existence mechanisms may refer to various techniques, or adaptations to air interface or wireless protocols, that, for example, minimize or reduce interference between multiple radios in a same device. As shown, the techniques in this example include operations that will be referred to herein as Channel Selection (CHS) where appropriate unlicensed carriers are analyzed, Opportunistic Supplemental Downlink (OSDL) where operation on one or more corresponding SCells is configured or deconfigured, and Carrier Sense Adaptive Transmission (CSAT) where the transmission power on those SCells is adapted, if necessary, by cycling between periods of high transmission power (e.g., an ON state, as a special case) and low transmission power (e.g., an OFF state, as a special case).

For CHS (block 610), a channel selection algorithm may perform certain periodic or event-driven scanning procedures (e.g., initial or threshold triggered) (block 612). With reference to FIG. 4, the scanning procedures may utilize, for example, one or a combination of the Wi-Fi radio 402, the LTE radio 404, the STA 450, and/or the UE 460. The scan results may be stored (e.g., over a sliding time window) in a corresponding database (block 614) and used to classify the different channels in terms of their potential for cellular operation (block 616). For example, a given channel may be classified, at least in part, based on whether it is a clean channel or whether it will need to be afforded some level of protection for co-channel communications. Various cost functions and associated metrics may be employed in the classification and related calculations.

If a clean channel is identified ('yes' at decision 618), a corresponding SCell may be operated without concern for impacting co-channel communications (state 619). On the other hand, if no clean channel is identified, further processing may be utilized to reduce the impact on co-channel communications ('no' at decision 618), as described below.

Turning to OSDL (block 620), input may be received from the channel selection algorithm as well as from other sources, such as various measurements, schedulers, traffic buffers, etc. (block 622), to determine whether unlicensed operation is warranted without a clean channel being available (decision 624). For example, if there is not enough traffic to support a secondary carrier in the unlicensed band ('no' at decision 624), the corresponding SCell that supports it may be disabled (state 626). Conversely, if there is a substantial amount of traffic ('yes' at decision 624), even though a clean channel is not available, an SCell may nevertheless be constructed from one or more of the remaining carriers by invoking CSAT operation (block 630) to mitigate the potential impact on co-existence.

The SCell may be initially enabled in a deconfigured state (state 628). The SCell along with one or more corresponding user devices may then be configured and activated (Block 630) for normal operation. In LTE, for example, an associated UE may be configured and deconfigured via corresponding radio resource control (RRC) Config/Deconfig messages to add the SCell to its active set. Activation and deactivation of the associated UE may be performed, for example, by using Medium Access Control (MAC) Control Element (CE) Activation/Deactivation commands. At a later time, when the traffic level drops below a threshold, for example, an RRC Deconfig message may be used to remove the SCell from the UE's active set, and return the system to the deconfigured state (state 628). If all UEs are deconfigured, OSDL may be invoked to turn the SCell off.

During CSAT operation (block 630), the SCell may remain configured but be cycled between periods of activated operation (state 632) and periods of deactivated operation (state 634) in accordance with a (long-term) Time Division Multiplexed (TDM) communication pattern. In the configured/activated state (state 632), the SCell may operate with one or more RF components at relatively high power (e.g., full powered ON state). In the configured/deactivated state (state 634), the SCell may operate with one or more RF components at a reduced, relatively low power (e.g., depowered OFF state).

Figure 7:
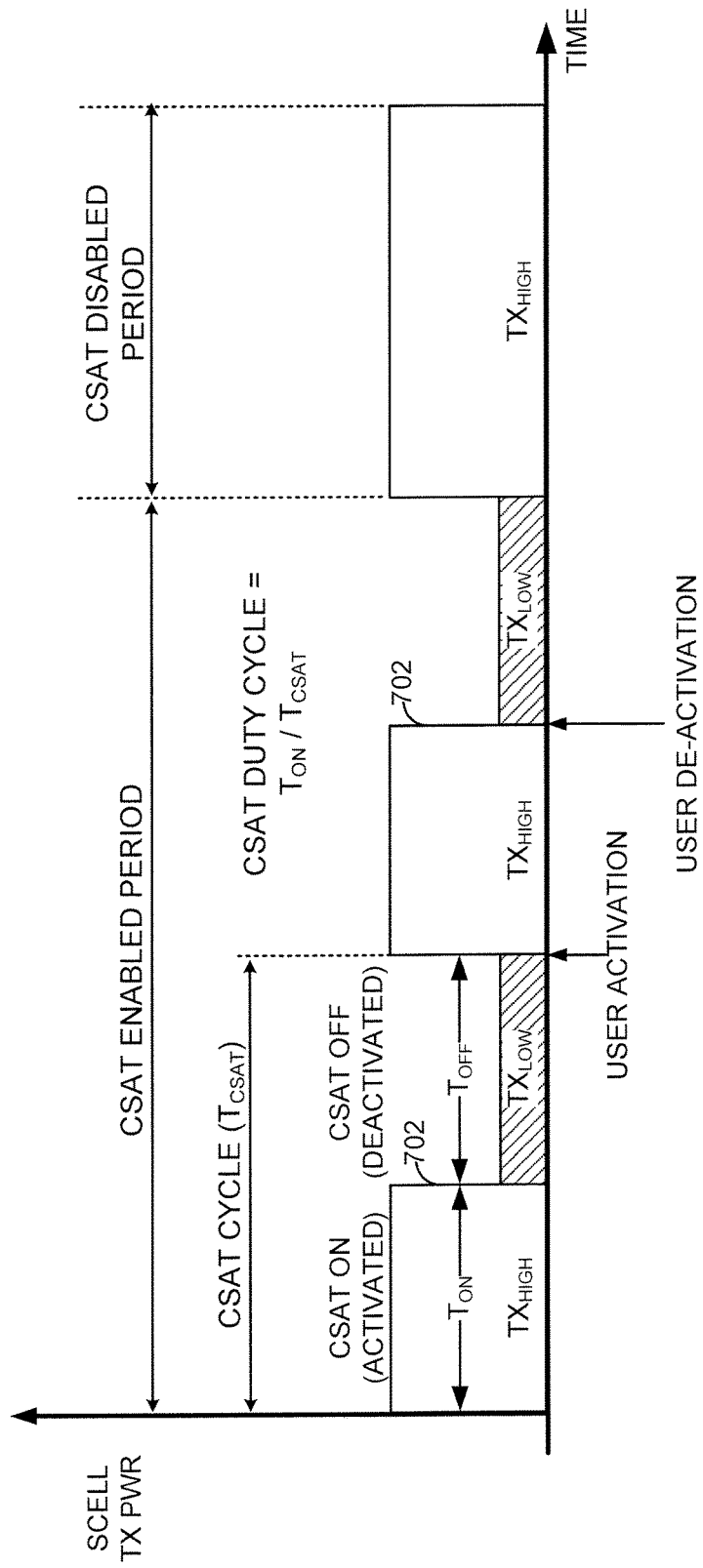
FIG. 7 illustrates in more detail certain aspects a Carrier Sense Adaptive Transmission (CSAT) communication scheme for cycling cellular operation in accordance with a long-term Time Division Multiplexed (TDM) communication pattern.

FIG. 7 illustrates, in more detail, certain examples of aspects of a CSAT communication scheme for cycling cellular operation in accordance with a long-term TDM communication pattern. As discussed above in relation to FIG. 6, CSAT may be selectively enabled on one or more SCells as appropriate to facilitate co-existence in unlicensed spectrum (e.g., even when a clean channel free of competing RAT operation is not available).

When enabled, SCell operation is cycled between CSAT ON 702 (activated) periods and CSAT OFF (deactivated) periods within a given CSAT cycle ($T_{CSAT}$). One or more associated user devices may be similarly cycled between corresponding MAC activated and MAC deactivated periods. During an associated activated period of time SCell transmission on the unlicensed band may proceed at a normal, relatively high transmission power. During an associated deactivated period of time $T_{OFF}$, however, the SCell remains in a configured state but transmission on the unlicensed band (e.g., and/or one or more corresponding RF components) is reduced or even fully disabled to yield the medium to a competing RAT (as well as to perform various measurements via a co-located radio of the competing RAT).

Each of the associated CSAT parameters, including, for example, the CSAT pattern duty cycle (i.e., $T_{ON}/T_{CSAT}$) and the relative transmission powers during activated/deactivated periods of time, may be adapted based on the current signaling conditions to optimize CSAT operation. As an example, if the utilization of a given channel by Wi-Fi devices is high, an LTE radio may adjust one or more of the CSAT parameters such that usage of the channel by the LTE radio is reduced. For example, the LTE radio may reduce its transmit duty cycle or transmit power on the channel (e.g., and/or one or more corresponding RF components). Conversely, if utilization of a given channel by Wi-Fi devices is low, an LTE radio may adjust one or more of the CSAT parameters such that usage of the channel by the LTE radio (e.g., and/or one or more corresponding RF components) is increased. For example, the LTE radio may increase its transmit duty cycle or transmit power on the channel. In either case, the CSAT ON 702 (activated) periods may be made sufficiently long (e.g., greater than or equal to about 200 milliseconds (ms)) to provide user devices with an opportunity to perform at least one measurement during each CSAT ON (activated) 702 period before the CSAT ON period ends.

A CSAT scheme as provided herein may offer several advantages for mixed RAT co-existence, particularly in unlicensed spectrums. For example, by adapting communication based on signals associated with a first RAT (e.g., Wi-Fi), a second RAT (e.g., LTE) may react to utilization of a co-channel by devices that use the first RAT while refraining from reacting to extraneous interference by other devices (e.g., non-Wi-Fi devices) or over adjacent frequency channels. As another example, a CSAT scheme enables a device that uses one RAT to control how much protection is to be afforded to co-channel communications by devices that use another RAT by adjusting the particular parameters (e.g., of one or more associated RF components) employed. In addition, such a scheme may be generally implemented without changes to the underlying RAT communication protocol. In an LTE system, for example, CSAT may be generally implemented without changing the LTE PHY or MAC layer protocols, but by simply changing the LTE software (e.g., to modify one or more parameters associated with one or more RF components).

To improve overall system efficiency, the CSAT cycle may be synchronized, in whole or in part, across different small cells, at least within a given operator. For example, the operator may set a minimum CSAT ON 702 (activated) period of time ($T_{ON,min}$) and a minimum CSAT OFF (deactivated) period of time ($T_{OFF,min}$). Accordingly, the CSAT ON 702 (activated) period durations and transmission powers may be different, but minimum deactivation times and certain channel selection measurement gaps may be synchronized. Moreover, the CSAT cycle (e.g., the duration of various aspects of the CSAT cycle) can be adaptable to be substantially any duration, which may include determining whether to use one or more durations based on radio conditions over the associated set of resources. For example, short and long CSAT cycles can be defined, and can be used based on determining whether signal strength(s) of signals received over the resources achieve one or more thresholds, whether signals received over the resources relate to a primary or secondary channel of the first RAT (e.g., Wi-Fi), etc. Examples of selecting a CSAT cycle length are described with respect to FIG. 11 below.

As described above, $T_{ON}$ for the CSAT cycle can be determined based at least in part on estimating a medium utilization (MU) by a RAT associated with an unlicensed RF band (e.g., Wi-Fi) over an associated set of resources (e.g., the unlicensed RF band or spectrum). It is to be appreciated that $T_{OFF}$ can be determined as $T_{ON}$ subtracted from the duration of the CSAT cycle, which may be of fixed duration. In an example, $T_{ON}$ can be adapted (e.g., by an SCell, terminal, or related radio, signal processing component 800, etc. as described herein) based on the estimated MU according to a formula similar to the following:

$$T_{ON}(n+1)=\min(T_{ON}(n)+\Delta T_1, T_{ON,max}), \text{ if } MU<Thr_1$$

$$T_{ON}(n+1)=T_{ON}(n), \text{ if } Thr_1 \leq MU \leq Thr_2$$

$$T_{ON}(n+1)=\max(T_{ON}(n)-\Delta T_2, T_{ON,min}), \text{ if } MU>Thr_2$$

where n is a given time period (e.g., a CSAT cycle), $\Delta T_1$ is a step value for increasing $T_{ON}$ where MU is less than a first threshold ($Thr_1$), $T_{ON,max}$ is a maximum value for $T_{ON}$, which may be less than the CSAT cycle duration to allow some time for Wi-Fi communications and may bound a $T_{OFF,min}$ by $T_{CSAT}-T_{ON,max}$ to provide co-channel Wi-Fi transmitters in the vicinity with an interference free interval for signaling, $\Delta T_2$ is a step value for decreasing $T_{ON}$ where MU is greater than a second threshold (Thr$_2$), and $T_{ON,min}$ is a minimum value for $T_{ON}$ to ensure some transmission time for LTE. In an example, the step values, threshold levels, etc., can be provisioned by a network, retrieved from a configuration by a device determining $T_{ON}$ and/or $T_{OFF}$ for a CSAT cycle, tuned based on observations of network performance, etc. In one example, $T_{ON,min}$ and $T_{ON,max}$ may by determined based at least in part on determining a number of active transmitters over the set of resources, as described further herein.

In addition, in an example, an SCell, terminal, or related radio, signal processing component 800, etc. can estimate MU of a RAT using a formula similar to the following:

$$MU(n) = \frac{1}{T_{OFF}(n)} \sum_{i=1}^{K} W_i \times D_i$$

where K is a number of signals or related packets received in a CSAT OFF period, W is a weight calculated for a given signal or packet (e.g., based on a received signal strength or one or more packet statistics or parameters), and D is a duration of the packet or related signal. Moreover, it is to be appreciated that the estimated MU can be periodically updated to include estimated MU of previous CSAT cycles, which may be weighted. For example:

$$\overline{MU}(1) = MU(1)$$

$$\overline{MU}(n) = \alpha(n)MU(n) + \beta(n)\overline{MU}(n-1) \text{ for } n>1$$

where $\alpha(n)$ and $\beta(n)$ can be functions of $T_{OFF}(n)$.

When an SCell, terminal, or related radio, signal processing component 800, etc. uses the above algorithm to compute MU, and thus $T_{ON}$ and $T_{OFF}$, Wi-Fi performance can improve due to backing-off LTE communications over a set of resources utilized for Wi-Fi communications. To ensure LTE is backed-off when a link is potentially interfered and not for all detected Wi-Fi communications over the resources, however, Wi-Fi packets or related signals can be evaluated to determine not only signal strength, as shown above, but also one or more other parameters of the signal in determining whether to consider the packets or related signals in computing MU for Wi-Fi. Examples of considering other additional parameters are described below. In addition, for example, Wi-Fi or wireless local area network (WLAN) packets can be detected based on a detected preamble, based on a detected packet structure, based on a detected long or short guard interval, etc. Moreover, alternatively to this adaptive determination of $T_{ON}$, for example, $T_{ON}$ for the CSAT cycle can be statically determined in some cases, such as where the set of resources correspond to primary channel transmissions in the first RAT (e.g., Wi-Fi) so as to protect the first RAT control data transmissions from second RAT transmissions. Examples of selection between static and adaptive determinations of CSAT intervals (e.g., $T_{ON}/T_{OFF}$) are described with respect to FIG. 11 below.

Figure 8:
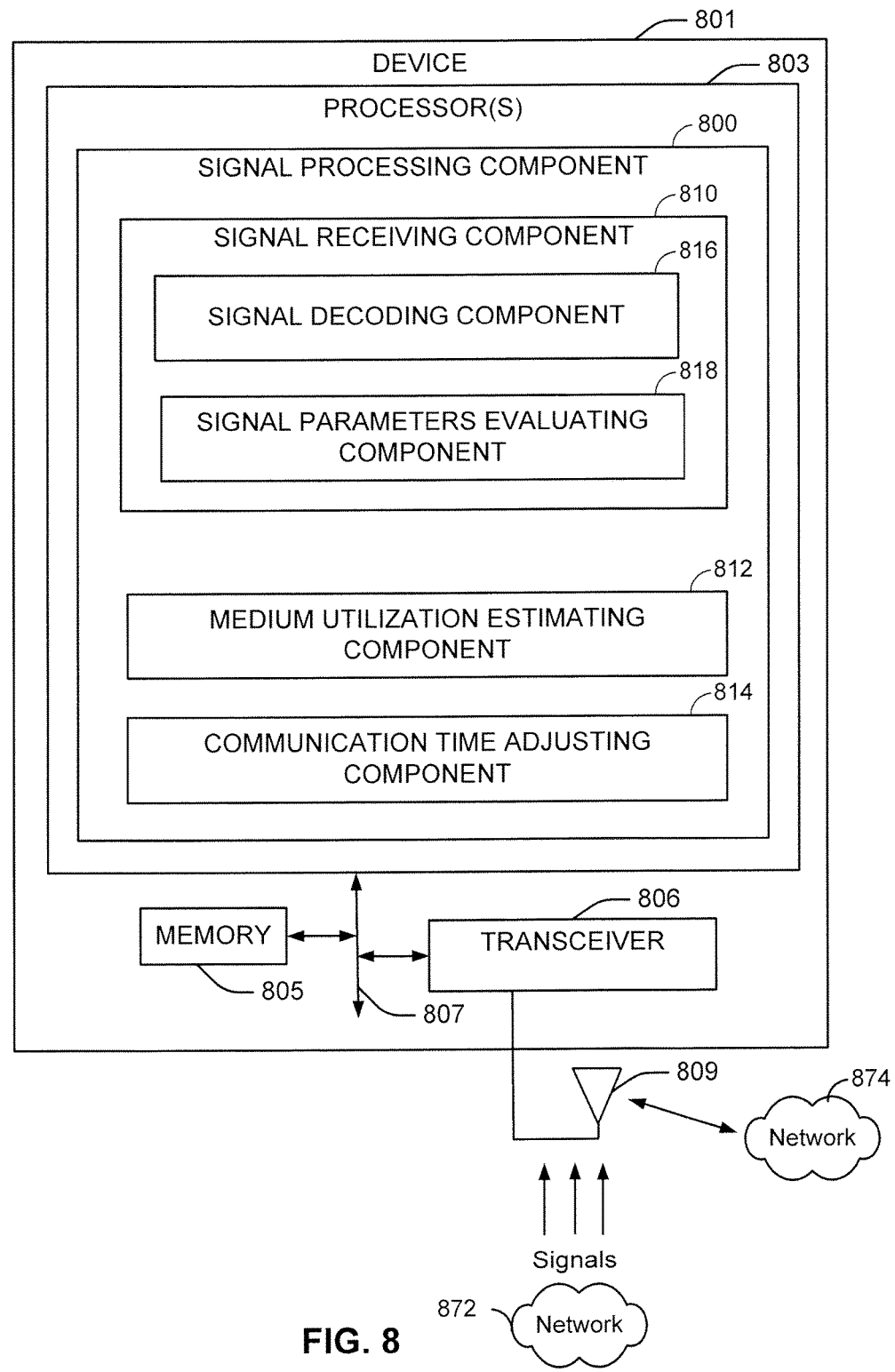
FIG. 8 is a simplified block diagram of an example signal processing component for estimating medium utilization based on signal parameters.
Figure 9:
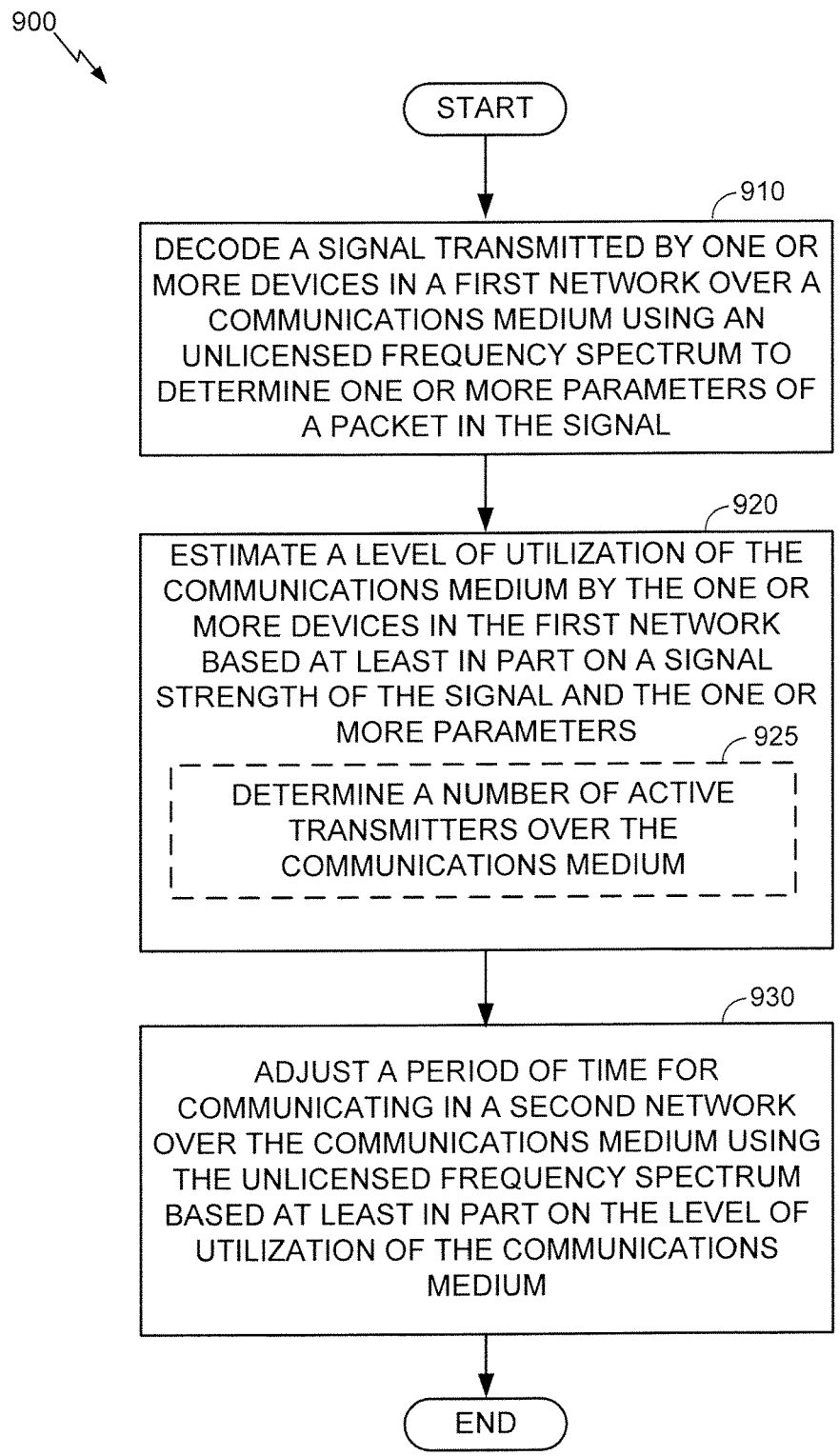
FIG. 9 is a flow diagram illustrating an example method of adjusting resource utilization based on estimating medium utilization of a first network.
Figure 10:
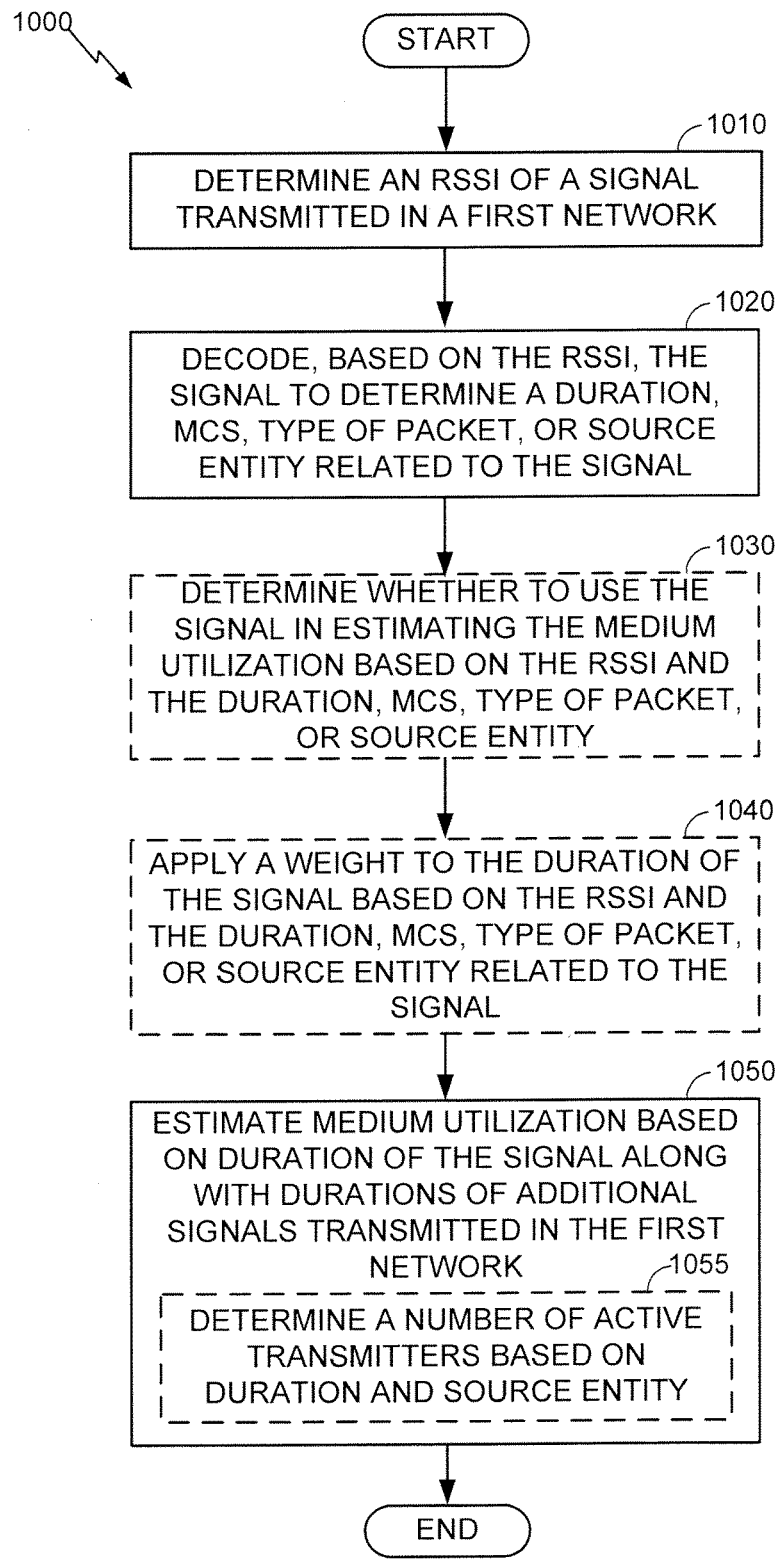
FIG. 10 is a flow diagram illustrating an example method of estimating medium utilization of a first network.
Figure 11:
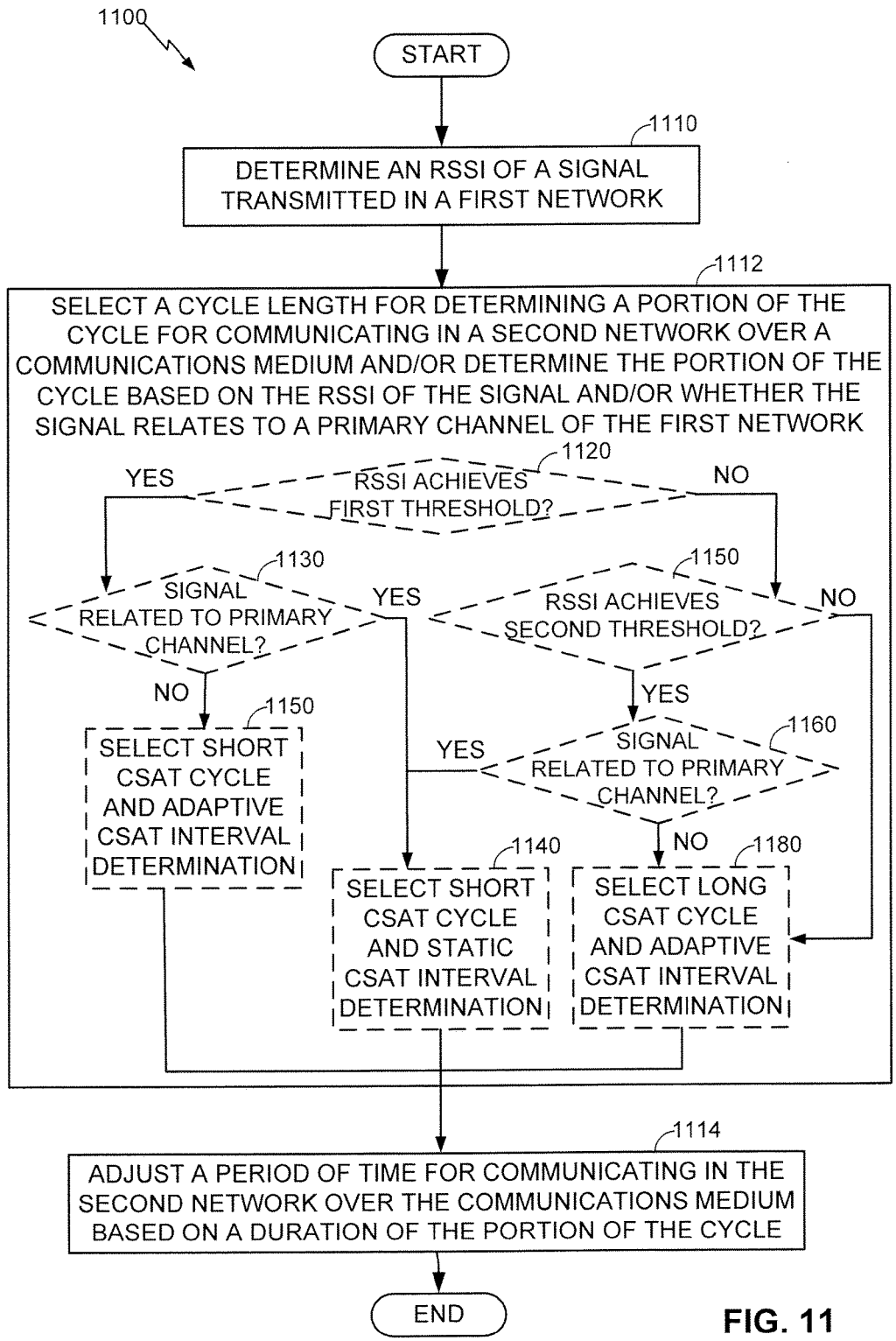
FIG. 11 is a flow diagram illustrating an example method of selecting a cycle length for determining a portion of the cycle for communicating in a second network.

Referring to FIGS. 8-11, aspects of the present apparatus and method are depicted with reference to one or more components and one or more methods that may perform the actions or functions described herein. Although the operations described below in FIGS. 9-11 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions. Moreover, in an aspect, a component may be one of the parts that make up a system, may be hardware or software, and/or may be divided into other components.

FIG. 8 illustrates an example device 801 that can employ a signal processing component 800 for estimating a MU in an RF band and/or performing interference mitigation or other operations over the RF band based on estimated MU. For example, device 801 may include a small cell base station (e.g., small cell base station 400), which may be a SCell in LTE, a UE, or substantially any device operating in a contention-based RF band using a RAT other than the RAT of other devices in the RF band.

For example, device 801 can include one or more processors 803 and/or a memory 805 that may be communicatively coupled, e.g., via one or more buses 807, and may operate in conjunction with or otherwise implement a signal processing component 800 configured to estimate MU and/or perform one or more operations based on estimated MU, in accordance with aspects described herein. For example, the various operations related to signal processing component 800 may be implemented or otherwise executed by one or more processors 803 and, in an aspect, can be executed by a single processor, while in other aspects, different ones of the operations may be executed by a combination of two or more different processors. For example, in an aspect, the one or more processors 803 may include any one or any combination of a modem processor, or a baseband processor, or a digital signal processor, or an application specific integrated circuit (ASIC), or a transmit processor, receive processor, or a transceiver processor associated with transceiver 806. In addition, device 801 can include one or more antennas 809 that can be used in transmitting or receiving signals in a wireless network. The one or more antennas 809 can be coupled to transceiver 806 and/or one or more related RF front end components (e.g., power amplifiers, low-noise amplifiers, analog-to-digital or digital-to-analog converters, etc.). For example, the one or more antennas can receive signals from a first network (e.g., network 872), over which devices can communicate using a first RAT, and can communicate signals in a second network (e.g., network 874), over which devices communicate using a second RAT.

Further, for example, the memory 805 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 803. Moreover, memory 805 or computer-readable storage medium may be resident in the one or more processors 803, external to the one or more processors 803, distributed across multiple entities including the one or more processors 803, etc.

In particular, the one or more processors 803 and/or memory 805 may execute actions or operations defined by signal processing component 800 or its subcomponents. For instance, the one or more processors 803 and/or memory 805 may execute actions or operations defined by a signal receiving component 810 for receiving and detecting signals of a first RAT based on parameters thereof. In an aspect, for example, signal receiving component 810 may include hardware (e.g., one or more processor modules of the one or more processors 803) and/or computer-readable code or instructions stored in memory 805 and executable by at least one of the one or more processors 803 to perform the specially configured signal receiving operations described herein. For example, in this regard, the one or more processors 803 and/or memory 805 may execute actions or operations defined by a signal decoding component 816 for decoding the signal, and/or a signal parameters evaluating component 818 for determining one or more parameters related to the signal.

Further, for instance, the one or more processors 803 and/or memory 805 may execute actions or operations defined by a medium utilization estimating component 812 for estimating a level of utilization of a communications medium by the first RAT. In an aspect, for example, medium utilization estimating component 812 may include hardware (e.g., one or more processor modules of the one or more processors 803) and/or computer-readable code or instructions stored in memory 805 and executable by at least one of the one or more processors 803 to perform the specially configured MU estimating operations described herein. Further, for instance, the one or more processors 803 and/or memory 805 may execute actions or operations defined by a communication time adjusting component 814 for determining a a period of time for communication for a second RAT based on the estimated level of utilization of the first RAT. In an aspect, for example, communication time adjusting component 814 may include hardware (e.g., one or more processor modules of the one or more processors 803) and/or computer-readable code or instructions stored in memory 805 and executable by at least one of the one or more processors 803 to perform the specially configured communication time adjusting operations described herein.

It is to be appreciated that transceiver 806 may be configured to transmit and receive wireless signals through one or more antennas, an RF front end, one or more transmitters, and one or more receivers. In an aspect, transceiver 806 may be tuned to operate at specified frequencies such that device 801 can communicate at a certain frequency. In an aspect, the one or more processors 803 may configure transceiver 806 to operate at a specified frequency and power level based on a configuration, a communication protocol, etc. to communicate uplink signals and/or downlink signals, respectively, over related uplink or downlink communication channels.

In an aspect, transceiver 806 can operate in multiple bands (e.g., using a multiband-multimode modem, not shown) such to process digital data sent and received using transceiver 806. In an aspect, transceiver 806 can be multiband and be configured to support multiple frequency bands for a specific communications protocol. In an aspect, transceiver 806 can be configured to support multiple operating networks and communications protocols. Thus, for example, transceiver 806 may enable transmission and/or reception of signals based on a specified modem configuration.

For example, device 801, and/or one or more components thereof, may also include a Wi-Fi radio 402, LTE radio 404, associated NL modules 406, 408 (FIG. 4), communication device 1214 (FIG. 12), etc., as described herein, and can employ these components in conjunction with the signal processing component 800 for detecting signals of a different RAT (e.g., signals transmitted by one or more devices communicating in the network 872) and estimating a medium utilization of the different RAT for adjusting a period of time (e.g., a CSAT ON 702 period) for communication using the RAT corresponding to the given radio (e.g., for communicating signals with one or more devices in the network 874). For example, the Wi-Fi radio 402, LTE radio, or associated NL modules 406, 408 may also be coupled to one or more antennas that are used in transmitting and/or receiving signals in a wireless network. As described, not all signals received over the communications medium may relate to the different RAT or otherwise may not impact communications of the RAT corresponding to the given radio. In this case, medium utilization estimating component 812 can determine whether to use the received signal (and/or determine a weight to assign to the received signals), based on determined parameters thereof, to estimate a more accurate level of utilization of the communications medium (e.g., by devices communicating in the network 872) than where only signal strength is used, and/or whether to include a source of the signal as an active transmitter in determining the number of active transmitters over the communications medium. It should be noted that, in one or more aspects as used herein, the term "component" may be one of the parts that make up a system, may be hardware or software, and may be divided into other components.

FIG. 9 is a flow diagram illustrating an example method 900 of CSAT communication for enhancing CSAT to consider additional signal parameters in determining whether to use one or more signals in estimating MU of a communications medium by a first network (e.g., network 872) using a first RAT (e.g., Wi-Fi). The method may be performed by an access point configured to communicate in a second network (e.g., network 874) and/or using a second RAT (e.g., the small cell base stations 110B, 110C illustrated in FIG. 1, small cell base station 400 in FIG. 4, etc.), or more generally a device 801, employing a signal processing component 800, for example. Moreover, it is to be appreciated that first and second networks are generally referred to herein, and may include networks that respectively operate on first and second RATs, as described above.

Method 900 includes, at Block 910, decoding a signal transmitted by one or more devices in a first network over a communications medium using an unlicensed frequency spectrum to determine one or more parameters of a packet in the signal. In an aspect, signal receiving component 810, e.g., in conjunction with one or more processor(s) 803, memory 805, and/or transceiver 806, can decode the signal transmitted by one or more devices the first network (e.g., network 872) over a communications medium using the unlicensed frequency spectrum to determine one or more parameters of a packet in the signal. For example, signal decoding component 816, e.g., in conjunction with one or more processor(s) 803, memory 805, and/or transceiver 806, can decode the signal (e.g., receiving via antenna(s) 809), and signal parameters evaluating component 818, e.g., in conjunction with one or more processor(s) 803, memory 805, and/or transceiver 806, can determine one or more parameters related to the signal. The one or more parameters can relate to a duration of the packet or signal, an MCS used to modulate the signal, a type of the packet or signal (e.g., data or control), an identification of a source entity transmitting the signal, and/or the like. The signal receiving component 810 can correspond to, can be included in, or can be employed by a receiver, a receiver portion of a transceiver 806 or other radio, etc., such as a Wi-Fi radio 402, LTE radio 404, associated NL modules 406, 408 (FIG. 4), communication device 1214 (FIG. 12), etc., employed by an access point or device to receive signals of first and second networks and/or of first and second RATs (e.g., LTE and Wi-Fi), and/or the like.

As described, signal receiving component 810 may receive the signal during a $T_{OFF}$ period or a similar period when communications over another network or RAT are backed-off or have not otherwise begun until estimation of MU and corresponding determination of $T_{ON}$ are completed. In a specific example, signal receiving component 810 may receive the signal as a Wi-Fi signal during the $T_{OFF}$ period, where the $T_{OFF}$ period may be determined according to the formulas described with respect to FIG. 4, when communications over an LTE radio are backed-off. In one example, a CSAT master cycle (CMC, also referred to as CSAT master cycle number (CMCN) in some contexts) can be defined to include a number of CSAT cycles such that signal processing component 800 can process signals for determining MU and the associated period of time for communication for the second RAT during $T_{OFF}$ periods in a portion of the CSAT cycles in the CMC. In a specific example, signal processing component 800 can process the signals during a portion of $T_{OFF}$ period of a last CSAT cycle in the CMC, which can be denoted by $T_{LastOFF,min}$. In some examples, the duration of CMC can be defined on the order of 320 ms or 640 ms where a CSAT cycle duration can be defined on the order of 80 ms, 160 ms, 320 ms, or 640 ms. Thus, for example, where the CMC is defined as 640 ms and the CSAT cycle is defined as 80 ms, signal processing component 800 can process signals for determining MU and the associated period of time for communication for the second RAT in the $T_{LastOFF,min}$ period of the last 80 ms CSAT cycle, and can refrain from such processing in the first 7 80 ms CSAT cycles to conserve processing resources. In any case, the estimated MU and associated period of time for communication (e.g., also referred to herein as a communication time) for the second RAT can apply for each CSAT cycle in the CMC (e.g., each of the first 7 80 ms CSAT cycles in the above example), after which signal processing component 800 can again process signals for the next CMC.

In an example, signal decoding component 816 may decode the signal at one or more layers at which signal parameters evaluating component 818 can determine the one or more parameters. For example, signal decoding component 816 may decode the packet at a physical (PHY) layer, and signal parameters evaluating component 818 can determine a duration of the signal or packet and/or an MCS of the signal based on the PHY layer decoding. In another example, signal decoding component 816 may decode the packet additionally or alternatively at a media access control (MAC) layer, and signal parameters evaluating component 818 may determine a packet type (e.g., whether the packet is a data packet or a control packet, such as a Wi-Fi acknowledgement (ACK) or similar packet), an identification of a source entity transmitting the packet, etc. based on the MAC layer decoding. For example, certain Wi-Fi packets may include a basic service set identification (BSSID), transmit address (TA), receive address (RA), etc. as part of the MAC header, which can be used to identify a source entity transmitting the packet. For instance, the MAC header can include various fields, including a frame control information field, a duration identifier field, an address 1 field, an address 2 field, an address 3 field, a sequence control field, an address 4 field, etc. The frame control information field can further include multiple fields, which may include a protocol version field, a type of the frame field, a subtype of the frame field, a to distribution system (DS) field, a from DS field, a more fragments field, etc. The "to DS" field and the "from DS" field may be bit fields respectively indicating whether the Wi-Fi packet is being transmitted to a DS node (e.g., an access point) or from a DS node. In this regard, for example, where the Wi-Fi packet indicates "to DS"=0 and "from DS"=1, this can indicate a packet transmitted from an access point to a STA, and correspondingly, the address 1 field of the MAC header can include the RA as the destination address (DA) of the STA, the address 2 field of the MAC header can include the TA as the source address (SA) of the access point, and the address 3 field can indicate the BSSID of the access point. Where the Wi-Fi packet indicates "to DS"=1 and "from DS"=0, for example, this can indicate a packet transmitted from STA to an access point, and correspondingly, the address 1 field of the MAC header can include the RA as the BSSID of the access point, the address 2 field of the MAC header can include the TA as the SA of the STA, and the address 3 field can indicate the DA of the access point. In addition, ACK packets may not include a TA, but can be associated with a TA of a preceding data packet (e.g., if an RA field of the ACK packet matches the TA field of the preceding data packet) for the purposes of estimating MU, as described further herein. Thus, signal parameters evaluating component 818 may determine the packet type, identification of a source entity transmitting the packet, etc. based on analyzing these parameters in the MAC header of the packet, and can use the packet type, identification of source, etc. to estimate MU of the RF band, as further described herein.

Method 900 also includes, at Block 920, estimating a level of utilization of the communications medium by the one or more devices in the first network based at least in part on a signal strength of the signal and the one or more parameters. In an aspect, medium utilization estimating component 812, e.g., in conjunction with one or more processor(s) 803, memory 805, and/or transceiver 806, can estimate the level of utilization of the communications medium (e.g., also referred to as a medium utilization (MU)) by the one or more devices in the first network (e.g., network 872) based at least in part on the signal strength of the signal and the one or more parameters (e.g., packet type, source address, etc.). In an example, signal parameters evaluating component 818 can determine the signal strength as a received signal strength indicator (RSSI) of the signal received from the one or more devices in the first network (e.g., via the receiver of the first network) or a similar measurement of received signal power. Using the one or more parameters in conjunction with the signal strength can result in a more accurate determination of the MU of the first network as compared to signal strength alone. For example, some received signals may not relate to the first network or may relate to signals that may not be interfered by other communications over the communications medium. In this regard, additionally determining the one or more parameters of the decoded signal provides additional information regarding the received signal to facilitate determining whether the signal or related packet is associated with a device that would be interfered by communications of device 801 over the communications medium or its related resources (e.g., RF resources). Thus, this information is used in estimating the MU of the first network by determining whether to include the signal in estimating the MU (e.g., using the formula above) and/or in determining a weight to apply to a duration of the signal in estimating the MU, as described further herein.

Estimating the level of utilization at Block 920 may also optionally include, at Block 925, determining a number of active transmitters over the communications medium. In an aspect, medium utilization estimating component 812, e.g., in conjunction with one or more processor(s) 803, memory 805, and/or transceiver 806, can determine the number of active transmitters over the communications medium. In an example, medium utilization estimating component 812 can collect statistics regarding the sensed Wi-Fi packets received over the communications medium to determine the number of active transmitters. For instance, medium utilization estimating component 812 can determine a signal strength (e.g., RSSI) of the Wi-Fi packets, a duration of the packets, and/or a source address/entity identified as transmitting the packets to determine whether the source entity is an active transmitter, as described further herein.

Method 900 also includes, at Block 930, adjusting a period of time for communicating in a second network over the communications medium using the unlicensed frequency spectrum based at least in part on the level of utilization of the communications medium. In an aspect, communication time adjusting component 814, e.g., in conjunction with one or more processor(s) 803, memory 805, and/or transceiver 806, can adjust the period of time for communicating (e.g., transmitting or receiving wireless signals) in the second network (e.g., network 872, which can use a second RAT) over the communications medium using the unlicensed frequency spectrum based at least in part on the level of utilization of the communications medium (e.g., by devices communicating in the network 872). For example, the period of time for communicating in the second network may correspond to a $T_{ON}$ duration (e.g., CSAT ON 702 period), as described above, or substantially any period of time during which the device 801 can transmit signals over the communications medium before a $T_{OFF}$ duration, during which the device 801 can cease transmitting the signals over the communications medium. For example, in adjusting the period of time, communication time adjusting component 814 may adjust a duty cycle for communicating over at least a portion of the set of resources in the second network (e.g., using a second RAT) based on determining the MU of the first network (e.g., that uses a first RAT), which may also include determining the number of active transmitters in the first network. As described, in an example, communication time adjusting component 814 can adjust the duty cycle by increasing or decreasing the duty cycle by a step value where the MU is less than a first threshold or greater than a second threshold (e.g., using the formulas described above in reference to FIG. 4), based on the determined number of active transmitters, etc.

Additional example aspects of the actions of decoding the signal and estimating MU based on RSSI and one or more parameters in this regard will now be described additionally in reference to method 1000 of FIG. 10. For example, Blocks 910 and 920 of FIG. 9 may include one or more or a portion of the Blocks described in FIG. 10. At Block 1010, an RSSI of a signal transmitted in a first network can be determined. In an aspect, signal parameters evaluating component 818, e.g., in conjunction with one or more processor(s) 803, memory 805, and/or transceiver 806, can determine the RSSI of the signal transmitted in the first network. For example, signal receiving component 810, e.g., in conjunction with one or more processor(s) 803, memory 805, and/or transceiver 806, can receive the signal from one or more devices communicating in the first network (e.g., using a first RAT), and signal parameters evaluating component 818 can determine the RSSI of the signal. As described, a co-located receiver of a first network can be used to obtain the first network signals (e.g., an LTE AP can include a co-located Wi-Fi radio for obtaining Wi-Fi signals) during a $T_{OFF}$ or similar back-off period where transmissions are not occurring (e.g., at the LTE AP).

Method 1000 also includes, at Block 1020, decoding, based on the RSSI, the signal to determine a duration, MCS, type of packet, or source entity related to the signal. In an aspect, signal decoding component 816, e.g., in conjunction with one or more processor(s) 803, memory 805, and/or transceiver 806, can decode, based on the RSSI, the signal to determine the duration, MCS, type of packet, or source entity related to the signals. As described, signal decoding component 816 can decode the signal at a PHY, MAC, or other layer, and signal parameters evaluating component 818 can determine the duration, MCS, type of packet, or source entity related to the signal. In addition, signal decoding component 816 may decode the signal (e.g., at Block 1020) based on the RSSI, such that if the RSSI achieves a first threshold RSSI, the signal need not be decoded, and medium utilization estimating component 812 can use the signal in estimating the MU (or not use the signal) based on the RSSI and regardless of the other signal parameters. Thus, for certain RSSI in an example, it can be assumed that communications over the resources would interfere with such signals, and these signals are used in estimating MU of the first network. In another example, if the RSSI does not achieve a second threshold RSSI, signal decoding component 816 may not decode the signal and the signal may be considered as not related to a device that may be impacted by device 801 operating in the unlicensed RF band, and thus not used in estimating MU.

Method 1000 also optionally includes, at Block 1030, determining whether to use the signal in estimating the medium utilization based on the RSSI and the duration, MCS, type of packet, or source entity. In an aspect, medium utilization estimating component 812, e.g., in conjunction with one or more processor(s) 803, memory 805, and/or transceiver 806, can determine whether to use the signal in estimating the MU based on the RSSI and the duration, MCS, type of packet, or source entity (and/or other parameters)s, as described.

Specifically, in an example, signal parameters evaluating component 818 can determine the MCS used by the data packet. In this example, medium utilization estimating component 812 can determine an indication of downlink SNR and uplink SNR for the first network signals (e.g., the signals on the Wi-Fi link) based on the MCS, since the MCS may be selected based on the SNR (and since ACK MCS has 1:1 mapping to downlink MCS). In addition, RSSI of the received data signal (referred to herein as $RSSI_{Data}$) determined by signal parameters evaluating component 818 can allow medium utilization estimating component 812 to further estimate pathloss to an AP of the first network (e.g., from an AP of the second network), and hence interference potentially caused to the AP of the first network on the downlink (e.g., interference by device 801—e.g., as an LTE AP—to a Wi-Fi AP) to receive ACK or uplink traffic. In addition, ACK or Block ACK of the uplink traffic can be received after Short Interframe Space (SIFS) duration from the data packet in Wi-Fi and can be identified by its duration. Thus, signal parameters evaluating component 818, in one example, can detect the ACK or Block ACK as a signal received after a SIFS duration relating to the received data signal, based on a duration of the signal, based on determining a source and/or destination MAC ID from a MAC header of the signal, etc. In one example, as described, signal parameters evaluating component 818 may detect the ACK or Block ACK corresponding to a data signal based at least in part on matching a RA in the MAC header of the ACK or Block ACK to a TA in a MAC header of the data signal. In any case, signal parameters evaluating component 818 can accordingly estimate pathloss to a device of the first network (e.g., a Wi-Fi device) as well based on a determined RSSI of the ACK signal (referred to herein as $RSSI_{ACK}$). Medium utilization estimating component 812 can determine an indication of potential interference (e.g., by the LTE AP) to downlink traffic to the first network device. Using the determined UL/DL SNR and/or UL/DL pathloss estimations, when available in this example, medium utilization estimating component 812 can estimate the drop of MCS in the first network due to potential interference by the device 801 (e.g., an AP of the second network—e.g., the LTE AP), and can accordingly determine whether to consider the signals in estimating medium utilization by the first network. For example, medium utilization estimating component 812, in this regard, may avoid considering signals that would not result in a threshold drop of MCS due to potential interference, which can provide a more accurate estimation of MU that would be impacted by potential interference from the AP of the second network.

In one example, medium utilization estimating component 812 may be configured to make conservative assumptions on the DL and UL transmit power in estimating pathloss as described above (although some Wi-Fi packets may include an indicator of the transmit power used, such as beacon in AP, in which case medium utilization estimating component 812 may determine the transmit power based on the transmit power indicated in the packet). Thus, from the estimated MCS drop and conservative assumptions regarding downlink and uplink transmit power (or the transmit power determined from the packets), medium utilization estimating component 812 may determine whether to include this packet in MU calculation and/or a weight to apply to a duration of the packet in MU calculation. Moreover, in an example, medium utilization estimating component 812 can further determine an expected increase in Wi-Fi reuse due to transmitting over the communications medium using device 801 in certain durations in determining whether to include the packet in MU calculation (e.g., include the packet with the reuse is determined to be over a threshold level).

In an example, the above considerations can be simplified to medium utilization estimating component 812 determining whether RSSI of the packet is less than a threshold, whether MCS of the packet is greater than a second threshold, and whether RSSI of a corresponding ACK packet is less than a third threshold. For example, the thresholds can be configured by a network operator to the medium utilization estimating component 812 (e.g., by an operation and management (O&M) server or similar network entity). For example, the network operator may determine the thresholds to achieve a desired trade-off between LTE performance and Wi-Fi protection. Based on these determinations (e.g., whether an RSSI is less than the first threshold, whether the MCS achieves a second threshold, and whether RSSI of a corresponding ACK is less than a third threshold), medium utilization estimating component 812 can determine whether to use the corresponding Wi-Fi packets (e.g., the original packet and/or the ACK packet) in calculating MU and/or a weight to apply to a duration of the packets in calculating MU, as described further below.

In a specific example, signal parameters evaluating component 818 can determine if the type of packet is a data packet (e.g., based on one or more parameters in the MAC header of the packet). If so, medium utilization estimating component 812 can determine if the RSSI of the data packet ($RSSI_{Data}$) is less than the first threshold RSSI (RSSI_Thr), and whether a function of the RSSI of the data packet, an RSSI of a corresponding ACK packet ($RSSI_{ACK}$), and the MCS (also referred to as $f(RSSI_{Data}, RSSI_{ACK}, MCS_{DL})$ herein) is greater than a second threshold ($\gamma$). If so, medium utilization estimating component 812 can utilize the signal (e.g., or a duration thereof) in estimating MU, depending on which of the foregoing values can be obtained from the signal and/or additional signals.

In one example, $f(RSSI_{Data}, RSSI_{ACK}, MCS_{DL})$ can include a function of the SNR and the signal-to-interference ratio (SIR) for the signals (e.g., $f(RSSI_{Data}, RSSI_{ACK}, MCS_{DL}) = SNR_{DL}/SIR_{DL}$). In this example, $SNR_{DL}$ can be the SNR of a signal received from the Wi-Fi device (e.g., by a Wi-Fi radio 402) measured during $T_{OFF}$. As described, for example, medium utilization estimating component 812 can estimate the DL SNR based on $MCS_{DL}$ of the received signal, such as by using $MCS_{DL}$ link curves that associate DL SNR to MCSs (e.g., based on a history of observed correlation between SNRs and MCS). For example, the $MCS_{DL}$ link curves may include one or more look-up tables of SNR to MCS mapping, which may be based on the history of observed correlation, based on a configuration received from a network entity, etc. $SIR_{DL}$ can be the SIR at the Wi-Fi device where interference is caused during $T_{ON}$ (e.g., by the LTE AP). As described, medium utilization estimating component 812 can estimate the signal level for the $SIR_{DL}$ using $SNR_{DL}$ and a conservative assumption regarding noise level. One example conservative assumption can be based on a 9 dB noise figure and a 20 MHz bandwidth. For example, medium utilization estimating component 812 may compute the noise floor based on kTB+NF, where k=a Boltzmann constant, T is the temperature in k, B is the system bandwidth, and NF is the noise figure (e.g., noise floor of −92 dBm computed as −174+10*log 10(20×10$^6$)+9, where kT is −174 dBm/Hz, B is 20e6 Hz for 20 MHz system bandwidth, and NF is 9 dB). In this example, medium utilization estimating component 812 can estimate the interference level caused to the Wi-Fi device (e.g., by device 801 as an LTE AP) using $RSSI_{ACK}$. This can include signal parameters evaluating component 818 detecting a subsequently received ACK signal based on a determined signal type, a duration between the data signal and the ACK signal (e.g., SIFS duration), a source/destination MAC ID in the MAC header, etc., as described, and medium utilization estimating component 812 can utilize the RSSI of the signal as an indication of pathloss (e.g., to the LTE AP).

Additionally or alternatively, in this example, $f(RSSI_{Data}, RSSI_{ACK}, MCS_{DL})$ as determined by medium utilization estimating component 812 can include a function of the SNR and the signal-to-interference-and noise ratio (SINR) for the signals (e.g., $f(RSSI_{Data}, RSSI_{ACK}, MCS_{DL}) = SNR_{DL}/SINR_{DL}$). In this example, $SNR_{DL}$ can be the SNR of a Wi-Fi device measured (e.g., estimated using $MCS_{DL}$ link curves) during $T_{OFF}$, as described. In this example, medium utilization estimating component 812 can determine the $SINR_{DL}$ at the Wi-Fi device where interference is caused during $T_{ON}$ (e.g., by device 801 as an LTE AP) and includes noise from the Wi-Fi device. Thus, for example, $SNR_{DL}/SINR_{DL}$ can be the ratio of physical rate during $T_{OFF}$ and $T_{ON}$. Another function of the $SNR_{DL}$ and $SINR_{DL}$ that can be used in this regard may include $SNR_{DL}/(\alpha SINR_{DL} +$ $(1−α)SNR_{DL}$), where α is a fixed parameter (e.g., open loop) or selected adaptively (e.g., closed loop), such as $α(t)=T_{ON}(t)/(T_{ON}(t)+T_{OFF}(t))$.

Moreover, in this example, in addition or alternatively to the computations above, medium utilization estimating component 812 can determine $f(RSSI_{Data}, RSSI_{ACK}, MCS_{DL})$ as equal to $RSSI_{ACK}$. For example, this computation can be selected where $MCS_{DL}$ cannot be determined from the packet (e.g., cannot be decoded from the PHY layer of the signal).

In certain configurations, signal parameters evaluating component 818 may not be able to detect an ACK for the received signal (e.g., the type of packet is determined to be data and no corresponding ACK has been received). This may occur, for example, where the Wi-Fi device to which the data signal is sent by the Wi-Fi AP is outside of a cell provided by the device 801 as an LTE AP that utilizes the signal processing component 800 (thus the LTE AP receives signals from the Wi-Fi AP but not from the Wi-Fi device). This may also occur, for example, where another Wi-Fi device or the LTE AP cell causes interference to the Wi-Fi device transmitting ACK signals to the Wi-Fi AP. In such cases, for example, medium utilization estimating component 812 can determine whether to use the signal in estimating the medium utilization based on determining whether the $SNR_{DL}$ is additionally less than a SNR threshold. For example, medium utilization estimating component 812 can compute the SNR threshold assuming for $RSSI_{ACK}$, N+4, where N is a noise power in decibel-milliwatts (dBm), and 4 dB corresponds to the minimum SNR level to decode a signal header (e.g., SIG header in 802.11a/n/ac, such as L-SIG, HT-SIG, VHT-SIG-A, etc.). In this regard, for example, medium utilization estimating component 812 can compute the SNR threshold as $(4+Tx_{SC}−Tx_{STA})/(1−1/γ)$, where $Tx_{SC}$ is a transmit power of the LTE AP in dBm, $Tx_{STA}$ is a conservative assumption on the Wi-Fi device transmit power in dBm (e.g., 15 dBm).

In other examples of certain configurations, signal parameters evaluating component 818 may not be able to detect data signals corresponding to received ACK packets. This may occur, for example, where the Wi-Fi AP to which the ACK is sent by the Wi-Fi device is outside of a cell provided by the device 801 as an LTE AP that utilizes the signal processing component 800 (thus the LTE AP receives signals from the Wi-Fi device but not the Wi-Fi AP). This may also occur, for example, where another Wi-Fi AP or the LTE AP cell causes interference to the Wi-Fi AP transmitting data signals to the Wi-Fi device. In such cases, for example, where signal parameters evaluating component 818 determines the type of packet as an ACK packet but no corresponding data signal is detected, medium utilization estimating component 812 can determine whether to use the signal in estimating the medium utilization based on determining whether the $RSSI_{ACK}$>the first threshold RSSI (RSSI_Thr) for data packets, as described above. In addition, in this regard, medium utilization estimating component 812 may also extend the duration of the signal to be the size of a data packet for the purposes of estimating MU, in one example, since an ACK packet is much shorter, though receiving the ACK may indicate similar interference to the actual data packet.

In addition, for example, medium utilization estimating component 812 can determine whether to use the signal in estimating the medium utilization based on the RSSI and the duration, MCS, or type of packet (e.g., at Block 1030) by determining to use the signal with a certain probability based on comparing the RSSI and the duration, MCS, type of packet, or function thereof, to multiple thresholds. Thus, for example, medium utilization estimating component 812 can determine to use the signal in estimating MU using a first probability $p_{high}$ where $RSSI_{Data} ≥ RSSI\_Thr_{high}$, using a second probability $p_{med}$ where $RSSI\_Thr_{med} ≤ RSSI_{Data} < RSSI\_Thr_{high}$, using a third probability $p_{low}$ where $RSSI\_Thr_{low} ≤ RSSI_{Data} < RSSI\_Thr_{med}$, etc.

Method 1000 optionally includes, at Block 1040, applying a weight to the duration of the signal based on the RSSI and the duration, MCS, or type of packet related to the signal. Thus, for example, in addition or alternatively to determining whether to use the signal in estimating the MU, medium utilization estimating component 812, e.g., in conjunction with one or more processor(s) 803, memory 805, and/or transceiver 806, can apply the weight to the duration of the signal based on the RSSI and the duration, MCS, or type of packet related to the signal (e.g., in estimating the MU). The weight can be applied using similar calculations as those described above for determining whether to use the signal in estimating the MU. In addition, the weight can be different based on different values for RSSI, $f(RSSI_{Data}, RSSI_{ACK}, MCS_{DL})$, etc. In one example, bins can be used to divide the packets according to different weights, where each bin has a condition related to RSSI, $f(RSSI_{Data}, RSSI_{ACK}, MCS_{DL})$, etc., and a corresponding weight.

For example, if medium utilization estimating component 812 determines a signal has $RSSI_{Data} ≥ RSSI\_Thr_1$, and $f_1(RSSI_{Data}, RSSI_{Ack}, MCS_{DL}) > γ_1$, medium utilization estimating component 812 can apply a first weight W1 to the duration of the signal, where $RSSI\_Thr_1$ is a first threshold RSSI and $γ_1$ is a first function threshold. Where medium utilization estimating component 812 determines the signal has $RSSI\_Thr_2 ≤ RSSI_{Data} < RSSI\_Thr_1$ and $f_2(RSSI_{Data}, RSSI_{ACK}, MCS_{DL}) > γ_2$, medium utilization estimating component 812 can apply a second weight W2 to the duration of the signal, where $RSSI\_Thr_2$ is a second RSSI threshold less than $RSSI\_Thr_1$, and $γ_2$ is a second function threshold less than $γ_1$. This can continue for varying levels of RSSI and function thresholds to $RSSI\_Thr_n ≤ RSSI_{Data} < RSSI\_Thr_{n-1}$, and $f_n(RSSI_{Data}, RSSI_{ACK}, MCS_{DL}) > γ_n$, a nth weight Wn is applied to the duration of the signal, where $RSSI\_Thr_n$ is a nth threshold RSSI less than $RSSI\_Thr_{n-1}$, which is a (n-1)th threshold less than $RSSI\_Thr_2$, and $γ_n$ is a nth function threshold RSSI less than $γ_2$. In one example, bins can be used to classify packets according to the relationship between RSSI and $f_1(RSSI_{Data}, RSSI_{ACK}, MCS_{DL})$ and one or more thresholds, and each bin can have a corresponding weight. For example, $f_n(RSSI_{Data}, RSSI_{ACK}, MCS_{DL})$ can be one of the functions described above.

Method 1000 also include, at Block 1050, estimating medium utilization based on duration of the signal along with durations of additional signals transmitted in the first network. In an aspect, medium utilization estimating component 812, e.g., in conjunction with one or more processor(s) 803, memory 805, and/or transceiver 806, can estimate MU based on the durations of the signal along with the durations of the additional signals transmitted in the first network (e.g., the durations as weighted in Block 1040 or otherwise and/or additionally based on whether the signals are determined to be used at Block 1030). For example, medium utilization estimating component 812 may estimate the MU using the following formula (described above with respect to FIG. 4):

$$MU(n) = \frac{1}{T_{OFF}(n)} \sum_{i=1}^{K} W_i \times D_i$$

where W is the weight applied at 1040 to the duration, D, of the signal.

In another specific example, medium utilization estimating component 812 can generate a packet classification data structure including parameters of Wi-Fi packets received during a monitoring time (e.g., a $T_{OFF}$ period) of a CSAT cycle (e.g., a last CSAT cycle in a CMC or otherwise) and analyzed by signal parameters evaluating component 818. The packet classification data structure may be similar to the following:

| Packet Index | Chan | Type | Sub-type | DS | BSS ID | TA | RSSI [dBm] | Dur (µs) | MCS |
|---|---|---|---|---|---|---|---|---|---|
| 1 | 149 | Data | Data | 01 | | | −66 | 2000 | 0 |
| 2 | 149 | Control | ACK | 00 | | | −82 | 100 | 0 |
| 3 | 149 | Data | Data | 01 | | | −75 | 3000 | 8 |
| ... | ... | ... | ... | ... | ... | ... | ... | ... | ... | where Chan is the channel over which the packet is received (which can indicate Wi-Fi), DS is the "to DS" field of the packet followed by the "from DS" field of the packet as described above, and Dur is the duration of the packet. It is to be appreciated that if the MAC header cannot be decoded, medium utilization estimating component 812 may include information extracted from the preamble in the database, and other fields can be left empty. In any case, medium utilization estimating component 812 may divide packets into different categories based on the respective parameters, and can assign a weight to each category. Thus, for example, where $W_i$ denotes the weight to be applied to the i-th detected packet (e.g., based on the RSSI, as described above) and $D_i$ denotes the duration of the packet during a period of time for monitoring the MU (also referred to herein as a monitoring time) in $CMC_n$, where n is an index of a CMC, and assuming that K packets were detected during the monitoring time, an example MU of $CMC_n$ can be computed as:

$$MU(n) = \frac{1}{ActualMonitoringTime} \sum_{i=1}^{K} W_i \times D_i$$

where the ActualMonitoringTime is the time the signal processing component 800 is actually processing signals during the $T_{OFF}$ period of a CSAT cycle (e.g., a last CSAT cycle in a CMC or otherwise). In addition, as described, this MU can be used for determining the $T_{ON}$ duration for substantially all CSAT cycles in $CMC_{n+1}$.

In addition, estimating the medium utilization at Block 1050 may also optionally include, at Block 1055, determining a number of active transmitters based on duration and source entity. In an aspect, medium utilization estimating component 812, e.g., in conjunction with one or more processor(s) 803, memory 805, and/or transceiver 806, may determine the number of active transmitters based on duration and source entity of the signal. Determining the number of active transmitters may be based at least in part on determining a medium utilization by each of one or more detected transmitters (e.g., source entities of one or more signals).

For example, medium utilization estimating component 812 can estimate a MU per BSSID, which may be based on the packet classification data structure described above. For example, medium utilization estimating component 812 can divide identified packets of the BSSID into different categories based on RSSI and assign a weight to each category. One example, is to assign a weight of 1 to packets having an RSSI greater than a threshold, and a weight of 0 to packets having an RSSI less than or equal to the threshold, such that only packets having RSSI that exceeds the threshold are considered in estimating MU. In any case, medium utilization estimating component 812 can determine MU for a specific $BSSID_j$ as:

$$MU_{BSSID_J}(n) = \frac{1}{ActualMonitoringTime} \sum_{i=1}^{K_j} W_{i,j} \times D_{i,j}$$

where $K_j$ packets are detected during the monitoring time for $BSSID_j$, which can include associating the packets with $BSSID_j$ based on determining at least one of: (1) packets having a DS of 01 (e.g., "to DS" of 0 and "from DS" of 1) and Address 2=$BSSID_j$; (2) packets having a DS of 00 and TA=$BSSID_j$; and/or (3) packets without a TA field (e.g., ACK packets) following a data packet and having the same RA as the TA of the data packet (e.g., an RA of $BSSID_j$).

Similarly, for example, medium utilization estimating component 812 can estimate a MU for each of multiple STAs, which may be based on the packet classification data structure described above. For example, medium utilization estimating component 812 can divide identified packets of the STA into different categories based on RSSI and assign a weight to each category. One example, is to assign a weight of 1 to packets having an RSSI greater than a threshold, and a weight of 0 to packets having an RSSI less than or equal to the threshold, such that only packets having RSSI that exceeds the threshold are considered in estimating MU. For example, medium utilization estimating component 812 can determine MU for a specific $STA_m$ as:

$$MU_{STA_m}(n) = \frac{1}{ActualMonitoringTime} \sum_{i=1}^{K_m} W_{i,m} \times D_{i,m}$$

where $K_m$ packets are detected during the monitoring time for $STA_m$, which can include associating the packets with $STA_m$ based on determining at least one of: (1) packets having a DS of 10 and Address 2=$STA_m$; (2) packets having a DS of 00 and TA=$STA_m$; and/or (3) packets without a TA field (e.g., ACK packets) following a data packet and having the same RA as the TA of the data packet (e.g., an RA of $STA_m$).

In this regard, for example, medium utilization estimating component 812 can compute the number of active transmitters for the BSSIDs as:

$$\sum_{j=1}^{TotalBSSIDs(m)} I\left(MU_{BSSID_j}(n) \geq \alpha_{ActiveBSSID} \frac{1}{TotalBSSIDs(n) + TotalSTAs(n)}\right)$$

and the number of active transmitters for the STAs as:

$$\sum_{m=1}^{TotalSTAs(m)} I\left(MU_{STA_m}(n) \geq \alpha_{ActiveSTA} \frac{1}{TotalBSSIDs(n) + TotalSTAs(n)}\right)$$

where I(.) is an indicator function, $\alpha_{Active\ BSSID} \in [0,1]$, $\alpha_{ActiveTA} \in [0,1]$, TotalBSSIDs(n) is the total number of BSSIDs sensed in the packets during the monitoring time, and TotalSTAs(n) is the total number of STAs sensed during the monitoring time. In addition, in an example, medium utilization estimating component 812 can compute the total number of active Wi-Fi Transmitters as a weighted sum of number of active BSSIDs and STAs:

NumActiveTransmitters(n)=BSSIDWeight×NumActiveBSSIDs(n)+STAWeight×NumActiveSTAs(n)

where BSSIDWeight $\in [0,1]$ and STAWeight $\in [0,1]$.

In an example, medium utilization estimating component 812 may track packets for a limited number of BSSIDs and/or STAs. In this example, if the number of total neighbor BSSIDs are higher than MaxBSSID, medium utilization estimating component 812 may compute the MU values for the first MaxBSSID detected BSSIDs (and/or the first MaxSTA detected STAs). In another example, medium utilization estimating component 812 may compute aggregate MU all encountered BSSIDs (and/or STAs). In any case, medium utilization estimating component 812 can send the number of active transmitters to the communication time adjusting component 814 for determining a communication time adjustment based on the MU and the number of active transmitters.

For example, adjusting the period of time for communicating in the second network at Block 930 of method 900 may be based on the level of utilization of the communications medium by the first network as well as the number of active transmitters, as described. For example, communication time adjusting component 814 may determine a MU for a current CSAT cycle or CMC (n) based on a previous CSAT cycle or CMC (n-1), which may be based on a formula to weight the MUs, such as:

$$\overline{MU}(n)=\alpha_{MU}MU(n)+(1-\alpha_{MU})\overline{MU}(n-1).$$

Similarly, communication time adjusting component 814 can determine the number of active transmitters for a current CSAT cycle or CMC based on a previous CSAT cycle or CMC, which may be based on a formula to weight the number of active transmitters, such as:

$$\overline{NumActiveTransmitters}(n)=\alpha_{NumAct}NumActiveTransmitters(n)+(1-\alpha_{NumAct})\overline{NumActiveTransmitters}(n-1)$$

In addition, as described, communication time adjusting component 814 can determine the communication time adjustment based on comparing the MU to one or more thresholds, as described above. In addition, where communication time adjusting component 814 adjusts a period of time for communication for multiple CSAT cycles in a CMC, communication time adjusting component 814 can modify the computed period of time in a last CSAT cycle of a CMC as:

$$T_{ON}(n+1,Last)=\min\{T_{ON}(n+1,Last),T_{CSAT}-T_{LastOFF,min}\}$$

where $T_{LastOFF,min}$ is a minimum off period for reliable MU monitoring, which may be configured at the apparatus employing the signal processing component 800.

In any case, communication time adjusting component 814 can determine at least a minimum time for $T_{ON}$, $T_{ON,min}$, and a maximum time for $T_{ON}$, $T_{ON,max}$, for use in determining the $T_{ON}$ duration for the CSAT cycle (and/or the other CSAT cycles in a CMC) based at least in part on the number of active transmitters over the communications medium. For example, communication time adjusting component 814 can determine $T_{ON,min}$ and $T_{ON,max}$ as:

$$T_{ON,min} = \min\left\{TONminInMilliSec, \left\lfloor\frac{(StrongSCSameOp+1) \times T_{CSAT}}{StrongSCSameOp+1+StrongSCDiffOp+NumActiveTransmitters(n)}\right\rfloor\right\}$$

$$T_{ON,max} = \min\left\{TONmaxInMilliSec, \left\lfloor\frac{(StrongSCSameOp+1) \times T_{CSAT}}{StrongSCSameOp+1+StrongSCDiffOp}\right\rfloor\right\}$$

where TONminInMilliSec=TONminShortInMilliSec during a short CSAT cycle if selected (as described further herein), TONminInMilliSec=TONminLongInMilliSec during a long CSAT cycle if selected (as described further herein), TONmaxInMilliSec=TONmaxShortInMilliSec during a short CSAT cycle, TONmaxInMilliSec=TONmaxLongInMilliSec during a long CSAT cycle, StrongSCSameOp is the number of cells (e.g., small cells) of the second RAT with PLMN IDs equal to the serving PLMN ID of the serving cell and whose RSSI is larger than a threshold RSSI_Thr$_{SamePLMNID}$, and StrongSCDiffOp is the number of cells (e.g., small cells) of the second RAT with PLMN IDs different from the serving PLMN ID and whose RSRP is larger than a threshold RSSI_Thr$_{DiffPLMNID}$.

In an example, TONminShortInMilliSec, TONminLongInMilliSec, TONmaxShortInMilliSec, and TONmaxLongInMilliSec may be configured at device 801 or other apparatus employing the signal processing component 800 (e.g., apparatus 1204) based on one or more parameters received from a network (e.g., from apparatus 1206) or otherwise stored in the device or apparatus employing the signal processing component 800 (e.g., in memory 805, memory component 1240 of apparatus 1204, etc.). In addition, signal processing component 800 can also determine StrongSCSameOp and StrongSCDiffOp based on signal receiving component 810 receiving signals of surrounding cells using the second RAT. This may be performed upon powering on device 801 or other apparatus employing the signal processing component 800 (e.g., apparatus 1204), during one or more subsequent measurement periods, and/or the like. In this regard, signal receiving component 810 can receive signals from surrounding cells using the second RAT (e.g., LTE cells), and signal parameters evaluating component 818 can determine whether the cells report the same PLMN ID as the apparatus employing the signal processing component 800 or a different PLMN ID. Signal parameters evaluating component 818 can accordingly determine whether the cells have a measured RSSI over a threshold that corresponds to whether the cell is of a same or different PLMN ID to determine StrongSCSameOp and StrongSCDiffOp.

In another example, communication time adjusting component 814 can determine $T_{ON,min}$ as:

$$T_{ON,min} = \min\left\{TONminInMilliSec, \left\lfloor \frac{(StrongSCSameOp + 1) \times T_{CSAT}}{StrongSCSameOp + 1 + StrongSCDiffOp + NumStrongWiFiDevices} \right\rfloor \right\}$$

where NumStrongWiFiDevices can indicate a number of detected WiFi devices to have an RSSI above a threshold. For example, NumStrongWiFiDevices can include BSSIDs and/or STAs determined to have one or more signals with RSSI over the threshold regardless of a load (e.g., regardless of signal duration over the communications medium). For example, medium utilization estimating component 812 can indicate NumStrongWiFiDevices to communication time adjusting component 814, and can determine NumStrongWiFiDevices as the number of BSSIDs and/or STAs determined from the packet classification, described above, as having one or more or a certain number of packets or related signals that are detected as having RSSI over the threshold.

In a further example, communication time adjusting component 814 can determine $T_{ON,min}$ as:

$$T_{ON,min} = \min\left\{TONminInMilliSec, \left\lfloor \frac{(StrongSCSameOp + 1) \times T_{CSAT}}{StrongSCSameOp + 1 + StrongSCDiffOp + StrongWiFiOnPrimary + StrongWiFiOnSecondary} \right\rfloor \right\}$$

where StrongWiFiOnPrimary can indicate a number of detected Wi-Fi devices on their primary channel to have a beacon RSSI above a primary threshold, and StrongWiFiOnSecondary can indicate a number of detected Wi-Fi devices on a secondary channel to have a beacon RSSI above a secondary threshold (and/or below the primary threshold). For example, StrongWiFiOnPrimary and Strong WiFiOnSecondary can include BSSIDs and/or STAs on primary and secondary channels determined to have beacon signals with RSSI over the primary and secondary thresholds, respectively, regardless of a load (e.g., regardless of signal duration over the communications medium). For example, medium utilization estimating component 812 can indicate StrongWiFiOnPrimary and Strong WiFiOnSecondary to communication time adjusting component 814, and can determine StrongWiFiOnPrimary and Strong WiFiOnSecondary as the number BSSIDs and/or STAs on their primary and secondary channels determined from the packet classification, described above, as having one or more or a certain number of beacon signals or related packets that are detected as having RSSI over the primary or secondary threshold, respectively.

In yet another example, where communication time adjusting component 814 determines the communication time adjustment for multiple CSAT cycles in a CMC, and where the determined communication time adjustment results in a communication time that is less than a threshold, communication time adjusting component 814 can set the communication time at the threshold (or another threshold) and can skip the communication time in subsequent CSAT cycles in the CMC, which can include adjusting the $T_{ON}$ interval to 0 in the subsequent CSAT cycles. For example, a $T_{ON}$ interval whose length is less than a threshold TONLowerBound, which may be configurable at an apparatus employing the signal processing component 800, may not be used in the CSAT cycle as it may not provide enough time to activate/deactivate the RF and send signals of the second RAT. This may result in scenarios where when there are many co-channel Wi-Fi transmitters in the vicinity, LTE signals may not be transmitted. Thus, to mitigate this potential issue, communication time adjusting component 814 can reduce the duty cycle by skipping some $T_{ON}$ intervals instead of reducing the $T_{ON}$ to less than TONLowerBound. In this example, where communication time adjusting component 814 determines that adjusting the communication time would result in $T_{ON}$<TONLowerBound, then for CSAT cycles in the CMC, $$1 \le i \le \frac{T_{CMC}}{T_{CSAT}}$$

(which may exclude the first CSAT to guarantee minimum ON time for LTE in a CMC), an index for determining which $T_{ON}$ to skip can be computed as:

$$SkipIndex = \max\left\{1, \left\lfloor \frac{T_{ON}(n, 1)}{TONLowerBound} \times \frac{T_{CMC}}{T_{CSAT}} \right\rfloor\right\}.$$

where $T_{ON,new}$ for all $1 \le i \le \frac{T_{CMC}}{T_{CSAT}}$ is set as:

$$T_{ON,new}(n, i) = \begin{cases} TONLowerBound, & i \le SkipIndex \\ 0, & i > SkipIndex \end{cases}.$$

In this regard, communication time adjusting component 814 can ensure at least some meaningful time is provided for transmitting signals of the second RAT though there may be many co-channel transmitters of the first RAT in the vicinity.

FIG. 11 is a flow diagram illustrating an example method 1100 of selecting a CSAT cycle length and/or whether to perform the adaptive CSAT interval determination described above or a static CSAT interval determination. The method may be performed by an access point configured to communicate in a second network and/or using a second RAT (e.g., the small cell base stations 110B, 110C illustrated in FIG. 1, small cell base station 400 in FIG. 4, etc.), or more generally a device 801, employing a signal processing component 800, for example. Moreover, it is to be appreciated that first and second networks are generally referred to herein, and may include networks that respectively operate on first and second RATs, as described above.

Method 1100 includes, at Block 1110, determining an RSSI of a signal transmitted in a first network. In an aspect, signal parameters evaluating component 818, e.g., in conjunction with one or more processor(s) 803, memory 805, and/or transceiver 806, can determine the RSSI of the signal transmitted in the first network. For example, signal receiving component 810, e.g., in conjunction with one or more processor(s) 803, memory 805, and/or transceiver 806, can receive the signal from one or more devices communicating in the first network (e.g., using a first RAT), and signal parameters evaluating component 818 can determine the RSSI (or other signal strength measurement) of the signal.

As described, a co-located receiver configured to communicate in the first network can be used to obtain the first network signals (e.g., device 801 as an LTE AP can include a co-located Wi-Fi radio 402 for obtaining Wi-Fi signals). In one example, this may be part of a configuration period for the device 801 to select a CSAT cycle length for determining $T_{ON}$ and $T_{OFF}$ durations for communicating over the communications medium. The device 801 may perform the configuration upon power up, during one or more specified or configurable time intervals following power up, based on detecting one or more events (e.g., with respect to radio conditions), etc. to ensure the CSAT cycle length is appropriate for given radio conditions.

Method 1100 can also include, at Block 1112, selecting a cycle length for determining a portion of the cycle for communicating in a second network over a communications medium and/or determining the portion of the cycle based on the RSSI of the signal and/or whether the signal relates to a primary channel of the first network. In an aspect, medium utilization estimating component 812, e.g., in conjunction with one or more processor(s) 803, memory 805, and/or transceiver 806, can select the cycle length for determining the portion of the cycle for communicating in the second network over the communications medium and/or can determine the portion of the cycle based on the RSSI of the signal and/or whether the signal relates to a primary channel of the first network. In this regard, medium utilization estimating component 812 can additionally determine whether to determine the portion of the cycle based on estimating the medium utilization or based on a number of active transmitters over the communications medium.

For example, selecting the cycle length and/or determining the portion of the cycle at Block 1112 may optionally include, at Block 1120, determining whether the RSSI achieves a first threshold. In an aspect, medium utilization estimating component 812, e.g., in conjunction with one or more processor(s) 803, memory 805, and/or transceiver 806, can determine whether the RSSI achieves the first threshold. For example, the first threshold may correspond to a clear channel assessment (CCA) energy detection (ED) threshold, which can be typically used in a CCA procedure performed to determine whether the (contention-based) channel is clear for communications. If the signal has an RSSI that achieves this threshold, this may be an indication that the signal is a signal of the first network (e.g., Wi-Fi) that would potentially be interfered by transmissions of the access point in the second network.

If the RSSI achieves the first threshold, method 1100 may also include, at Block 1130, determining whether the signal is related to a primary channel in the first network. This can include decoding the signal to determine the related channel. In an aspect, medium utilization estimating component 812, e.g., in conjunction with one or more processor(s) 803, memory 805, and/or transceiver 806, can determine whether the signal is related to the primary channel or not. For example, medium utilization estimating component 812 can determine whether the signal is for a primary channel based at least in part on decoding the signal and detecting one or more preambles in the signal, where primary channel signals may use different preamble structures than secondary channel signals (e.g., as in Wi-Fi).

If the signal is related to the primary channel, method 1100 can include, at Block 1140, selecting a short CSAT cycle and a static CSAT interval determination. In an aspect, medium utilization estimating component 812, e.g., in conjunction with one or more processor(s) 803, memory 805, and/or transceiver 806, can select the short CSAT cycle and static CSAT interval determination. For example, as described above, short (e.g., 80/160 ms) and long (e.g., 160/320/640 ms) CSAT cycles can be defined, and determination of the $T_{ON}$ and/or $T_{OFF}$ periods in the CSAT cycles can be adaptive (as described in FIGS. 9-10 above) or static. Determination of a static CSAT cycle, for example, may be based on one or more parameters used in medium utilization estimation, such as $T_{ON,min}$, which can be based on determining a number of active transmitters, as described above. Thus, in this example, medium utilization estimating component 812 can select the short CSAT cycle for determining the $T_{ON}$ duration, where the short CSAT cycle duration may be configured at the access point, and can determine the $T_{ON}$ duration based on $T_{ON,min}$ and irrespective of an estimated medium utilization (e.g., determine $T_{ON}$ as equal to $T_{ON,min}$).

If the signal is not related to the primary channel at Block 1130, method 1100 can include, at Block 1150, selecting a short CSAT cycle and an adaptive CSAT interval determination. In an aspect, medium utilization estimating component 812, e.g., in conjunction with one or more processor(s) 803, memory 805, and/or transceiver 806, can select the short CSAT cycle and adaptive CSAT interval determination. Thus, in this example, medium utilization estimating component 812 can select the short CSAT cycle for determining the $T_{ON}$ duration, and can determine the $T_{ON}$ duration based on an estimated medium utilization (e.g., and between $T_{ON,min}$ and $T_{ON,max}$), as described above with respect to FIGS. 9-10.

If the RSSI does not achieve the first threshold at Block 1120, method 1100 can include, at Block 1150, determining whether the RSSI achieves a second threshold. In an aspect, medium utilization estimating component 812, e.g., in conjunction with one or more processor(s) 803, memory 805, and/or transceiver 806, can determine whether the RSSI achieves the second threshold. For example, the second threshold may correspond to a CCA preamble detection (PD) threshold, which can be typically used in a CCA procedure to determine whether a signal is strong enough to potentially detect a preamble If the signal has an RSSI that does not achieve the CCA ED threshold but achieves this threshold, this may be an indication that the signal may at least be a preamble signal in the first network (e.g., Wi-Fi), and would potentially be interfered by transmissions of the access point in the second network.

If the RSSI achieves the second threshold, method 1100 may also include, at Block 1160, determining whether the signal is related to a primary channel in the first network. This can include decoding the signal to determine the related channel. In an aspect, medium utilization estimating component 812, e.g., in conjunction with one or more processor(s) 803, memory 805, and/or transceiver 806, can determine whether the signal is related to the primary channel or not, as described. If so, method 1100 can include, at Block 1140, selecting the short CSAT cycle and static CSAT interval determination, as described above. If not, method 1100 can include, at Block 1180, selecting the long CSAT cycle and adaptive CSAT interval determination. In an aspect, medium utilization estimating component 812, e.g., in conjunction with one or more processor(s) 803, memory 805, and/or transceiver 806, can select the long CSAT cycle, which may be of a duration configured at the access point, and can select the adaptive CSAT interval determination (e.g., to determine the $T_{ON}$ duration based on an estimated medium utilization), as described above with respect to FIGS. 9-10.

In one example, selecting the cycle length and/or determining the portion of the cycle, at Block 1112, may include performing Blocks 1120-1180 to determine if a threshold number of received signals achieve the thresholds at Blocks 1120 and/or 1150 or relate to primary channels or not at Blocks 1130 and/or 1160, such to determine a short or long CSAT cycle or static or adaptive CSAT interval determination at Blocks 1140, 1150, and/or 1180. Thus, for example, medium utilization estimating component 812 can select a long CSAT cycle and adaptive CSAT interval determination can be selected by default. If medium utilization estimating component 812 detects a threshold number of signals (e.g., from distinct Wi-Fi access points) above the CCA ED threshold as a primary channel, a threshold number of signals above the CCA PD threshold, or a threshold number of signals above the CCA ED threshold as a secondary channel, medium utilization estimating component 812 utilizes the short CSAT cycle. Further where medium utilization estimating component 812 detects the threshold number of signals above the CCA ED threshold as a primary channel, or the threshold number of signals above the CCA PD threshold, medium utilization estimating component 812 further utilizes static CSAT interval determination, as described.

Method 1100 also includes, at Block 1114, adjusting a period of time for communicating in the second network over the communications medium based on a duration of the portion of the cycle. In an aspect, communication time adjusting component 814, e.g., in conjunction with one or more processor(s) 803, memory 805, and/or transceiver 806, can adjust the period of time for communicating in the second network over the communications medium based on the duration of the portion of the cycle (and/or based on a duration of the cycle). As described above, the portion of the cycle can be determined based on whether a short or long CSAT cycle is selected and/or based on whether static or adaptive CSAT interval determination is selected. In addition, the period of time can correspond to a $T_{ON}$ duration (e.g., CSAT ON 702 period) or substantially any period of time during which the device 801 can transmit signals over the communications medium before a $T_{OFF}$ duration begins, etc. In any case, medium utilization estimating component 812 can indicate an estimated medium utilization and/or a number of active transmitters over the communications medium to the communication time adjusting component 814 for determining the time adjustment (e.g., the $T_{ON}$ duration based on static or adaptive determination, as described).

Figure 12:
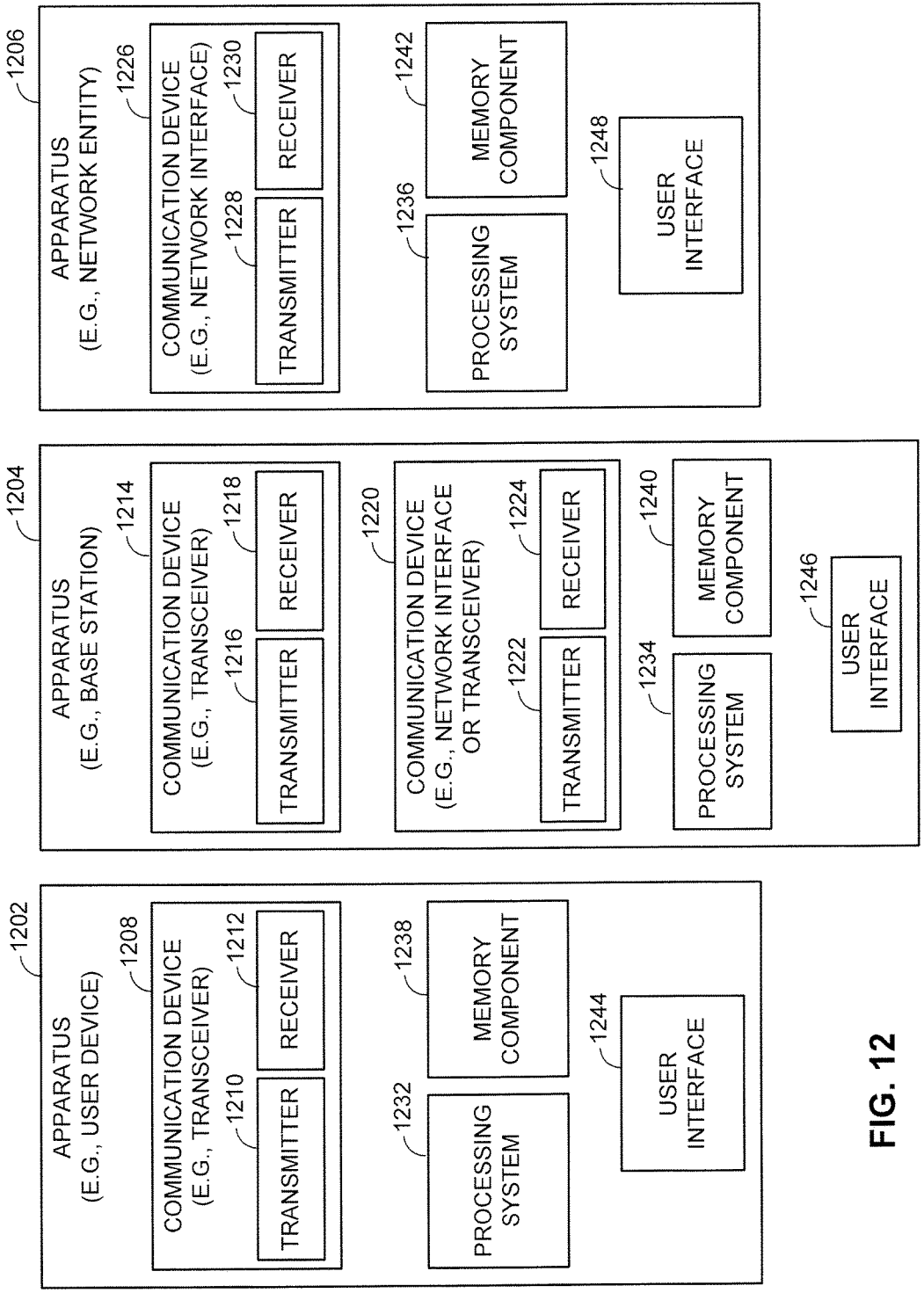
FIG. 12 is a simplified block diagram of several sample aspects of components that may be employed in communication nodes and configured to support communication as taught herein.

FIG. 12 illustrates several sample components (represented by corresponding blocks) that may be incorporated into an apparatus 1202, an apparatus 1204, and an apparatus 1206 (corresponding to, for example, a user device, a base station, and a network entity, respectively) to support the medium utilization estimation and corresponding interference mitigation operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1202 and the apparatus 1204 each include at least one wireless communication device (represented by the communication devices 1208 and 1214 (and the communication device 1220 if the apparatus 1204 is a relay)) for communicating with other nodes via at least one designated RAT. For example, communication devices 1208, 1214 may include a transceiver 806. Each communication device 1208 includes at least one transmitter (represented by the transmitter 1210) for transmitting and encoding signals (e.g., messages, indications, information, and so on) and at least one receiver (represented by the receiver 1212) for receiving and decoding signals (e.g., messages, indications, information, pilots, and so on). Similarly, each communication device 1214 includes at least one transmitter (represented by the transmitter 1216) for transmitting signals (e.g., messages, indications, information, pilots, and so on) and at least one receiver (represented by the receiver 1218) for receiving signals (e.g., messages, indications, information, and so on). If the apparatus 1204 is a relay station, each communication device 1220 may include at least one transmitter (represented by the transmitter 1222) for transmitting signals (e.g., messages, indications, information, pilots, and so on) and at least one receiver (represented by the receiver 1224) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1204 may also comprise a Network Listen Module (NLM) or the like for performing various measurements.

The apparatus 1206 (and the apparatus 1204 if it is not a relay station) includes at least one communication device (represented by the communication device 1226 and, optionally, 1220) for communicating with other nodes. For example, the communication device 1226 may comprise a network interface that is configured to communicate with one or more network entities via a wire-based or wireless backhaul. In some aspects, the communication device 1226 may be implemented as a transceiver configured to support wire-based or wireless signal communication. This communication may involve, for example, sending and receiving: messages, parameters, or other types of information. Accordingly, in the example of FIG. 12, the communication device 1226 is shown as comprising a transmitter 1228 and a receiver 1230. Similarly, if the apparatus 1204 is not a relay station, the communication device 1220 may comprise a network interface that is configured to communicate with one or more network entities via a wire-based or wireless backhaul. As with the communication device 1226, the communication device 1220 is shown as comprising a transmitter 1222 and a receiver 1224.

The apparatuses 1202, 1204, and 1206 also include other components that may be used in conjunction with the medium utilization estimation and corresponding interference mitigation operations as taught herein. The apparatus 1202 includes a processing system 1232 for providing functionality relating to aspects taught herein and for providing other processing functionality. The apparatus 1204 includes a processing system 1234 for providing functionality relating to aspects taught herein such as, for example, estimating a level of utilization of a communications medium by a network, accordingly adjusting a time for communicating in another network, etc., as taught herein and for providing other processing functionality. The apparatus 1206 includes a processing system 1236 for providing functionality relating to aspects taught herein and for providing other processing functionality. In an example, one or more of the processing systems 1232, 1234, 1236 may include one or more processors 803. The apparatuses 1202, 1204, and 1206 include memory components 1238, 1240, and 1242 (e.g., each including a memory device), respectively, for maintaining information (e.g., information indicative of reserved resources, thresholds, parameters, and so on). In addition, the apparatuses 1202, 1204, and 1206 include user interface devices 1244, 1246, and 1248, respectively, for providing indications (e.g., audible and/or visual indications) to a user and/or for receiving user input (e.g., upon user actuation of a sensing device such a keypad, a touch screen, a microphone, and so on). In an example, one or more of the processing systems 1238, 1240, 1242 may include memory 805.

For convenience, the apparatuses 1202, 1204, and/or 1206 are shown in FIG. 12 as including various components that may be configured according to the various examples described herein. It will be appreciated, however, that the illustrated blocks may have different functionality in different designs.

The components of FIG. 12 may be implemented in various ways. In some implementations, the components of FIG. 12 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1208, 1232, 1238, and 1244 may be implemented by processor and memory component(s) of the apparatus 1202 (e.g., by execution of appropriate code and/or by appropriate configuration of processor components). Similarly, some or all of the functionality represented by blocks 1214, 1220, 1234, 1240, and 1246 may be implemented by processor and memory component(s) of the apparatus 1204 (e.g., by execution of appropriate code and/or by appropriate configuration of processor components). Also, some or all of the functionality represented by blocks 1226, 1236, 1242, and 1248 may be implemented by processor and memory component(s) of the apparatus 1206 (e.g., by execution of appropriate code and/or by appropriate configuration of processor components).

Figure 13:
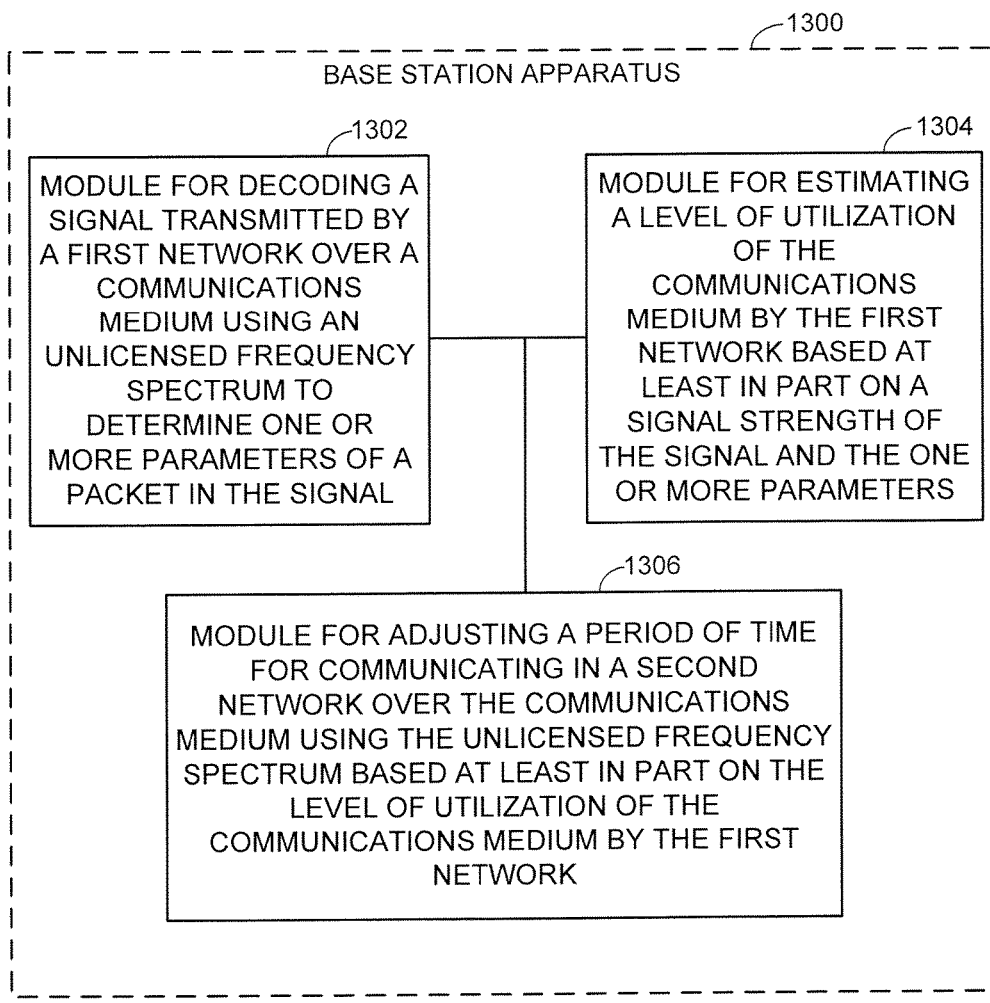
FIG. 13 is another simplified block diagram of sample aspects of an apparatus configured to support communication as taught herein.

FIG. 13 illustrates an example base station apparatus 1300 represented as a series of interrelated functional modules. A module for decoding a signal transmitted by a first network over a communications medium using an unlicensed frequency spectrum to determine one or more parameters of a packet in the signal 1302 may correspond at least in some aspects to, for example, a signal decoding component, a signal receiving component, a signal processing component, a transceiver, etc. as discussed herein. A module for estimating a level of utilization of the communications medium by the first network based at least in part on a signal strength of the signal and the one or more parameters 1304 may correspond at least in some aspects to, for example, a medium utilization estimating component, a processing system, etc. as discussed herein. A module for adjusting a period of time for communicating in a second network over the communications medium using the unlicensed frequency spectrum based at least in part on the level of utilization of the communications medium by the first network 1306 may correspond at least in some aspects to, for example, a communication time adjusting component, a processing system, etc. as discussed herein. The functionality of the modules of FIG. 13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein.

FIG. 14 illustrates an example of a wireless communication system 1400 environment in which the medium utilization estimation and corresponding interference mitigation teachings and structures herein may be may be incorporated. The wireless communication system 1400, which will be described at least in part as an LTE network for illustration purposes, includes a number of eNBs 1410 and other network entities. Each of the eNBs 1410 provides communication coverage for a particular geographic area, such as macro cell or small cell coverage areas.

In the illustrated example, the eNBs 1410A, 1410B, and 1410C are macro cell eNBs for the macro cells 1402A, 1402B, and 1402C, respectively. The macro cells 1402A, 1402B, and 1402C may cover a relatively large geographic area (e.g., several kilometers in radius) and may allow unrestricted access by UEs with service subscription. The eNB 1410X is a particular small cell eNB for the small cell 1402X. The small cell 1402X may cover a relatively small geographic area and may allow unrestricted access by UEs with service subscription. The eNB 1410X, for example, may include a signal processing component 800, as described herein, for estimating a MU and utilizing the estimated MU in performing one or more operations (e.g., interference mitigation). The eNBs 1410Y and 1410Z are particular small cell eNBs for cells 1402Y and 1402Z, respectively. The small cells 1402Y and 1402Z may cover a relatively small geographic area (e.g., a home) and may allow unrestricted access by UEs (e.g., when operated in an open access mode) or restricted access by UEs having association with the small cell (e.g., UEs in a Closed Subscriber Group (CSG), UEs for users in the home, etc.), as discussed in more detail below.

The wireless communication system 1400 also includes a relay station 1410R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 14, the relay station 1410R communicates with the eNB 1410A and a UE 1420R in order to facilitate communication between the eNB 1410A and the UE 1420R. A relay station may also be referred to as a relay eNB, a relay, etc.

The wireless communication system 1400 is a heterogeneous network in that it includes eNBs of different types, including macro eNBs, small cell eNBs (such as pico eNBs, femto eNBs, relays, and/or the like), etc. As discussed in more detail above, these different types of eNBs may have different transmit power levels, different coverage areas, and different impacts on interference in the wireless communication system 1400. For example, macro eNBs may have a relatively high transmit power level whereas small cell eNBs may have a lower transmit power level (e.g., by a relative margin, such as a 10 dBm difference or more).

Returning to FIG. 14, the wireless communication system 1400 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1430 may couple to a set of eNBs and provide coordination and control for these eNBs. The network controller 1430 may communicate with the eNBs 1410 via a backhaul. The eNBs 1410 may also communicate with one another, e.g., directly or indirectly via a wireless or wireline backhaul.

As shown, the UEs 1420 may be dispersed throughout the wireless communication system 1400, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 14, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1420Y may be in proximity to small cell eNBs 1410Y, 1410Z. Uplink transmissions from UE 1420Y may interfere with small cell eNBs 1410Y, 1410Z. Uplink transmissions from UE 1420Y may jam small cell eNBs 1410Y, 1410Z and degrade the quality of reception of other uplink signals to small cell eNBs 1410Y, 1410Z.

Small cell eNBs such as the small cell eNB 1410X and small cell eNBs 1410Y, 1410Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, small cell eNB 1410Y may be an open-access small cell eNB with no restricted associations to UEs. The small cell eNB 1410Z may be a higher transmission power eNB initially deployed to provide coverage to an area. Small cell eNB 1410Z may be deployed to cover a large service area. Meanwhile, small cell eNB 1410Y may be a lower transmission power eNB deployed later than small cell eNB 1410Z to provide coverage for a hotspot area (e.g., a sports arena or stadium) for loading traffic from either or both eNB 1410C, eNB 1410Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for medium utilization estimation and corresponding interference mitigation, as described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for reducing interference between networks, comprising:
   decoding a signal transmitted by one or more devices in a first network over a communications medium using an unlicensed frequency spectrum to determine one or more parameters in a header of a packet in the signal;
   determining, based at least in part on the one or more parameters, that the packet is an acknowledgement packet of a previous communication from the first network;
   computing, based on determining that the packet is an acknowledgement packet of the previous communication, an estimated level of utilization of the communications medium by the one or more devices in the first network based at least in part on all of a signal strength of the signal and the one or more parameters and a second signal strength of the previous communication; and
   adjusting a period of time for communicating in a second network over the communications medium using the unlicensed frequency spectrum based at least in part on the estimated level of utilization of the communications medium.

2. The method of claim 1, further comprising determining a number of active transmitters over the communications medium based at least in part on identifying a source entity related to transmission of the signal and the previous communication.

3. The method of claim 2, wherein determining the number of active transmitters is based at least in part on classifying the signal and the previous communication based on an identification of the source entity in the signal.

4. The method of claim 3, further comprising computing a second estimated level of utilization of the communications medium by the source entity based at least in part on determining a duration of the signal and/or one or more other signals classified as transmitted by the source entity over a period of time.

5. The method of claim 4, wherein determining the number of active transmitters is based at least in part on the second estimated level of utilization of the communications medium computed for the source entity and other estimated levels of utilization of the communications medium computed for other source entities.

6. The method of claim 2, further comprising setting at least one of a minimum time for communicating in the second network over the communications medium, a maximum time for communicating in the second network over the communications medium, or any combination thereof, based at least in part on the number of active transmitters, wherein adjusting the time for communicating in the second network is based on at least one of the minimum time, the maximum time, or any combination thereof.

7. The method of claim 6, wherein setting the at least one of the minimum time and the maximum time is further based at least in part on determining a number of access points in the second network having signal strengths that achieve one or more thresholds.

8. The method of claim 2, wherein adjusting the time for communicating in the second network is further based at least in part on the number of active transmitters.

9. The method of claim 2, wherein determining the number of active transmitters comprises determining whether the signal from the source entity and/or other signals from other source entities achieve a threshold signal strength.

10. The method of claim 2, wherein determining the number of active transmitters comprises determining whether the signal from the source entity and/or other signals from other source entities are over a primary or secondary channel and/or include beacon signals that achieve one or more threshold signal strengths.

11. The method of claim 1, wherein the one or more parameters include one or more of a duration of the signal, a modulation and coding scheme (MCS) of the signal, or a type of the packet.

12. The method of claim 11, further comprising:
   determining a signal-to-noise ratio (SNR) based at least in part on the MCS of the signal, wherein the signal strength is determined based on the SNR;
   determining a signal-to-interference ratio (SIR) based at least in part on the signal strength, a transmit power for communicating in the second network, and a determined pathloss based on another signal strength of an acknowledgement packet related to the signal; and
   determining to utilize the duration of the signal in computing the estimated level of utilization of the communications medium based at least in part on comparing a ratio of the SNR to the SIR to a threshold.

13. The method of claim 11, further comprising:
   determining a signal-to-noise ratio (SNR) based at least in part on the MCS of the signal, wherein the signal strength is determined based on the SNR;
   determining a signal-to-interference-and-noise ratio (SINR) based at least in part on the signal strength, a determined noise power related to the signal, a transmit power for communicating in the second network, and a determined pathloss based on another signal strength of an acknowledgement packet related to the signal; and
   determining to utilize the duration of the signal in computing the estimated level of utilization of the communications medium based at least in part on comparing a ratio of the SNR to the SINR to a threshold.

14. The method of claim 11, further comprising determining to utilize the duration of the signal in computing the estimated level of utilization of the communications medium based at least in part on determining that the packet is the acknowledgement packet of the previous communication and on comparing the signal strength to a threshold, wherein determining that the packet is the acknowledgement packet of the previous communication comprises determining that a receive address in the header of the packet matches a transmit address in a second header of the previous communication.

15. The method of claim 11, further comprising:
determining a signal-to-noise ratio (SNR) based at least in part on the MCS of the signal, wherein the signal strength is based on the SNR; and
determining a signal-to-interference ratio (SIR) based at least in part on the signal strength, a transmit power for communicating in the second network, and a determined pathloss based on another signal strength of an acknowledgement packet related to the signal; and
applying a weight to the duration of the signal in computing the estimated level of utilization of the communications medium based at least in part on comparing a ratio of the SNR to the SIR to one or more thresholds.

16. The method of claim 11, further comprising:
determining a signal-to-noise ratio (SNR) based at least in part on the MCS of the signal, wherein the signal strength is determined based on the SNR;
determining a signal-to-interference-and-noise ratio (SINR) based at least in part on the signal strength, a determined noise power related to the signal, a transmit power for communicating in the second network, and a determined pathloss based on another signal strength of an acknowledgement packet related to the signal; and
applying a weight to the duration of the signal in computing the estimated level of utilization of the communications medium based at least in part on comparing a ratio of the SNR to the SINR to one or more thresholds.

17. The method of claim 11, further comprising applying a weight to the duration of the signal in computing the estimated level of utilization of the communications medium based at least in part on determining that the packet is the acknowledgement packet of the previous communication and on comparing the signal strength to one or more thresholds.

18. The method of claim 1, wherein decoding the signal is based at least in part on determining the signal strength of the signal is at least at a threshold level.

19. The method of claim 1, wherein communications by the second network are based on Carrier Sense Adaptive Transmission (CSAT), the method further comprising receiving the signal during a period in which transmission by the second network is OFF ($T_{OFF}$) in a CSAT cycle of a CSAT ON period.

20. The method of claim 1, wherein the first network is a Wi-Fi network and the second network is a Long Term Evolution (LTE) network.

21. The method of claim 1, wherein adjusting the time for communicating in the second network over the communications medium includes skipping the time in one or more cycles based at least in part on determining that adjusting the time results in the time being less than a threshold.

22. An apparatus for reducing interference between networks, comprising:
a transceiver;
a memory configured to store a buffer including one or more messages for transmitting via the transceiver; and
at least one processor communicatively coupled with the transceiver and the memory, wherein the at least one processor is configured to:
decode a signal transmitted by one or more devices in a first network over a communications medium using an unlicensed frequency spectrum to determine one or more parameters in a header of a packet in the signal;
determine, based at least in part on the one or more parameters, that the packet is an acknowledgement packet of a previous communication from the first network;
compute, based on determining that the packet is an acknowledgement packet of the previous communication, an estimated level of utilization of the communications medium by the one or more devices in the first network based at least in part on all of a signal strength of the signal and the one or more parameters and a second signal strength of the previous communication; and
adjust a period of time for communicating in a second network over the communications medium using the unlicensed frequency spectrum based at least in part on the estimated level of utilization of the communications medium.

23. The apparatus of claim 22, wherein the one or more parameters include one or more of a duration of the signal, a modulation and coding scheme (MCS) of the signal, or a type of the packet.

24. The apparatus of claim 23, wherein the at least one processor is further configured to:
determine a signal-to-noise ratio (SNR) based at least in part on the MCS of the signal, wherein the signal strength is determined based on the SNR; and
determine a signal-to-interference ratio (SIR) based at least in part on the signal strength, a transmit power for communicating in the second network, and a determined pathloss based on another signal strength of an acknowledgement packet related to the signal; and
determine to utilize the duration of the signal in computing the estimated level of utilization of the communications medium based at least in part on comparing a ratio of the SNR to the SIR to a threshold.

25. The apparatus of claim 22, wherein the at least one processor is configured to decode the signal based at least in part on determining the signal strength of the signal is at least at a threshold level.

26. The apparatus of claim 22, further comprising at least one antenna coupled to the transceiver, wherein the antenna is used in receiving or transmitting one or more signals.

27. An apparatus for reducing interference between networks, comprising:
means for decoding a signal transmitted by one or more devices in a first network over a communications medium using an unlicensed frequency spectrum to determine one or more parameters in a header of a packet in the signal;
means for determining, based at least in part on the one or more parameters, that the packet is an acknowledgement packet of a previous communication from the first network;
means for computing, based on determining that the packet is an acknowledgement packet of the previous communication, an estimated level of utilization of the communications medium by the one or more devices in the first network based at least in part on all of a signal strength of the signal and the one or more parameters and a second signal strength of the previous communication; and
means for adjusting a period of time for communicating in a second network over the communications medium using the unlicensed frequency spectrum based at least in part on the estimated level of utilization of the communications medium.

28. The apparatus of claim 27, wherein the means for decoding decodes the signal based at least in part on determining the signal strength of the signal is at least at a threshold level.

29. A non-transitory computer-readable medium storing computer executable code for reducing interference between networks, the code comprising:
   code for decoding a signal transmitted by one or more devices in a first network over a communications medium using an unlicensed frequency spectrum to determine one or more parameters in a header of a packet in the signal;
   code for determining, based at least in part on the one or more parameters, that the packet is an acknowledgement packet of a previous communication from the first network;
   code for computing, based on determining that the packet is an acknowledgement packet of the previous communication, an estimated level of utilization of the communications medium by the one or more devices in the first network based at least in part on all of a signal strength of the signal and the one or more parameters and a second signal strength of the previous communication; and
   code for adjusting a period of time for communicating in a second network over the communications medium using the unlicensed frequency spectrum based at least in part on the estimated level of utilization of the communications medium.

30. The non-transitory computer-readable medium of claim 29, wherein the code for decoding decodes the signal based at least in part on determining the signal strength of the signal is at least at a threshold level.

\* \* \* \* \*